US012592756B2

(12) United States Patent
Wang

(10) Patent No.: US 12,592,756 B2
(45) Date of Patent: Mar. 31, 2026

(54) MEASUREMENT RESOURCE CONFIGURATION METHOD AND APPARATUS AND RELATED DEVICE

(71) Applicant: VIVO MOBILE COMMUNICATION CO., LTD., Guangdong (CN)

(72) Inventor: Chenxi Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 222 days.

(21) Appl. No.: 18/354,102

(22) Filed: Jul. 18, 2023

(65) Prior Publication Data

US 2023/0361837 A1     Nov. 9, 2023

Related U.S. Application Data

(63) Continuation of application No. PCT/CN2022/071313, filed on Jan. 11, 2022.

(30) Foreign Application Priority Data

Jan. 18, 2021     (CN) ......................... 202110063409.8
Feb. 9, 2021     (CN) ......................... 202110178633.1

(51) Int. Cl.
  *H04B 7/06*         (2006.01)
  *H04L 5/00*         (2006.01)
  *H04W 24/10*         (2009.01)

(52) U.S. Cl.
  CPC ......... *H04B 7/0626* (2013.01); *H04L 5/0048* (2013.01); *H04L 5/0057* (2013.01); *H04W 24/10* (2013.01)

(58) Field of Classification Search
None
See application file for complete search history.

(56) References Cited

U.S. PATENT DOCUMENTS

| 2019/0281487 | A1 | 9/2019 | Liu et al. |
| 2019/0335475 | A1 | 10/2019 | Liang et al. |
| 2020/0153497 | A1 | 5/2020 | Tsai et al. |
| 2020/0267584 | A1 | 8/2020 | Kim et al. |
| 2021/0337549 | A1 | 10/2021 | Zhang et al. |

(Continued)

FOREIGN PATENT DOCUMENTS

| CN | 103516464 A | 1/2014 |
| CN | 111431687 A | 7/2020 |

(Continued)

OTHER PUBLICATIONS

European Search Report for Application No. 22738997.0, Jun. 21, 2024, 10 pages.

(Continued)

*Primary Examiner* — Scott M Sciacca
(74) *Attorney, Agent, or Firm* — BROOKS KUSHMAN P.C.

(57)     ABSTRACT

A measurement resource configuration method and apparatus, and a related device, and pertains to the field of communication technologies. A terminal receives indication information sent by a network-side device, where the indication information is used to indicate configuration or modification information of a target channel state information CSI report configuration of the terminal.

20 Claims, 5 Drawing Sheets

(56)          References Cited

U.S. PATENT DOCUMENTS

| | | | | |
|---|---|---|---|---|
| 2021/0351825 | A1 | 11/2021 | Zhang et al. | |
| 2022/0140878 | A1* | 5/2022 | Zhu | H04B 7/0404 |
| | | | | 370/252 |
| 2023/0056263 | A1* | 2/2023 | Kim | H04L 5/0057 |
| 2023/0231607 | A1* | 7/2023 | Zhou | H04B 7/0636 |
| | | | | 370/330 |

FOREIGN PATENT DOCUMENTS

| | | | |
|---|---|---|---|
| CN | 111432479 | A | 7/2020 |
| CN | 111436223 | A | 7/2020 |
| JP | 2020501386 | A | 1/2020 |
| WO | 2019099857 | A1 | 5/2019 |
| WO | 2019221471 | A1 | 11/2019 |
| WO | 2020056708 | A1 | 3/2020 |
| WO | 2020060347 | A1 | 3/2020 |
| WO | 2020143647 | A1 | 7/2020 |

OTHER PUBLICATIONS

First Japanese Office Action for Japanese Application No. 2023-543216 mailed Jun. 12, 2024. 6 pages.

First Office Action for Chinese Application No. 202110178633.1, dated Dec. 26, 2023, 11 Pages.

International Search Report and Written Opinion for Application No. PCT/CN2022/071313, dated Apr. 6, 2022, 8 Pages.

China Academic Journal Electronic Publishing House "CCE rsource allocation based on reported CQI for TD-LTE system" Li Xiaowen, Luo Jia, Communication and Network, China, 2013, 4 Pages.

Internet Engineering Task Force "Definition of Managed Objects for Performance Reporting draft-ietf-manet-report-mib-01" R. Cole, 2011, 74 Pages.

Spreadtrum Communications "Discussion on CSI enhancement for multiple TRP/Panel transmission" 3GPP TSG RAN WG1#102-e, e-Meeting, Aug. 2020, R1-2006262, 4 Pages.

* cited by examiner

Network-side device 11        11        Terminal

Terminal

Start

Receive indication information sent by a network-side device        201

End

MEASUREMENT RESOURCE CONFIGURATION METHOD AND APPARATUS AND RELATED DEVICE

CROSS-REFERENCE TO RELATED APPLICATIONS

This application is a continuation of International Application No. PCT/CN2022/071313, filed on Jan. 11, 2022, which claims priority to Chinese Patent Application No. 202110063409.8, filed on Jan. 18, 2021, and Chinese Patent Application No. 202110178633.1, filed on Feb. 9, 2021, which are incorporated herein by reference in their entireties.

TECHNICAL FIELD

This application pertains to the field of communications technologies and specifically relates to a measurement resource configuration method and apparatus and a related device.

BACKGROUND

Currently, UE calculates CSI (CSI) by measuring channel state information-reference signal (CSI-RS) resources or synchronization signal block (SSB) resources configured in a channel state information (CSI) report configuration, where the CSI report configuration is configured by radio resource control (RRC) signaling. When determining, based on actual scheduling or user equipment (UE) feedback information, that configuration or adjustment of receiving, measuring, and reporting behaviors of the UE is required, a network-side device needs to configure one or more new CSI report configurations through RRC. Such implementation not only leads to large signaling overheads, but also restricts the flexibility of adjusting the behavior states of the UE due to the long RRC signaling processing time.

SUMMARY

According to a first aspect, a measurement resource configuration method is provided, executed by a terminal and including:

receiving indication information sent by a network-side device, where the indication information is used to indicate configuration or modification information of a target channel state information CSI report configuration of the terminal.

According to a second aspect, a measurement resource configuration method is provided, executed by a network-side device and including:

sending indication information to a terminal, where the indication information is used to indicate configuration or modification information of a target channel state information CSI report configuration of the terminal.

According to a third aspect, a measurement resource configuration apparatus is provided, executed by a terminal and including:

a receiving module, configured to receive indication information sent by a network-side device, where the indication information is used to indicate configuration or modification information of a target channel state information CSI report configuration of the terminal.

According to a fourth aspect, a measurement resource configuration apparatus is provided, executed by a network-side device and including:

a sending module, configured to send indication information to a terminal, where the indication information is used to indicate configuration or modification information of a target channel state information CSI report configuration of the terminal.

According to a fifth aspect, a terminal is provided, where the terminal includes a processor, a memory, and a program or instructions stored in the memory and capable of running on the processor, and when the program or instructions are executed by the processor, the steps of the measurement resource configuration method according to the first aspect are implemented.

According to a sixth aspect, a network-side device is provided, where the network-side device includes a processor, a memory, and a program or instructions stored in the memory and capable of running on the processor, and when the program or instructions are executed by the processor, the steps of the measurement resource configuration method according to the second aspect are implemented.

According to a seventh aspect, a readable storage medium is provided, where the readable storage medium stores a program or instructions, and when the program or instructions are executed by a processor, the steps of the measurement resource configuration method according to the first aspect are implemented; or when the program or instructions are executed by a processor, the steps of the measurement resource configuration method according to the second aspect are implemented.

According to an eighth aspect, a chip is provided, where the chip includes a processor and a communication interface, the communication interface is coupled to the processor, and the processor is configured to run a program or instructions on a network-side device to implement the measurement resource configuration method according to the first aspect or to implement the measurement resource configuration method according to the second aspect.

According to a ninth aspect, a computer program product is provided, where the computer program product is stored in a non-transitory storage medium, and the computer program product is executed by at least one processor to implement the measurement resource configuration method according to the first aspect or to implement the measurement resource configuration method according to the second aspect.

According to a tenth aspect, a communication device is provided, where the communication device is configured to execute the measurement resource configuration method according to the first aspect or to execute the measurement resource configuration method according to the second aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in such a way is interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more than one. In addition, "and/or" in the specification and claims represents at least one of connected objects, and the character "/" generally indicates that the associated objects have an "or" relationship.

It should be noted that technologies described in the embodiments of this application are not limited to a long term evolution (LTE) or LTE-Advanced (LTE-A) system, and may also be applied to other wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (New Radio, NR) system is described for an illustration purpose, and NR terms are used in most of the following descriptions, although these technologies may also be applied to other applications than an NR system application, for example, the 6th generation (6G) communication system.

Figure 1:
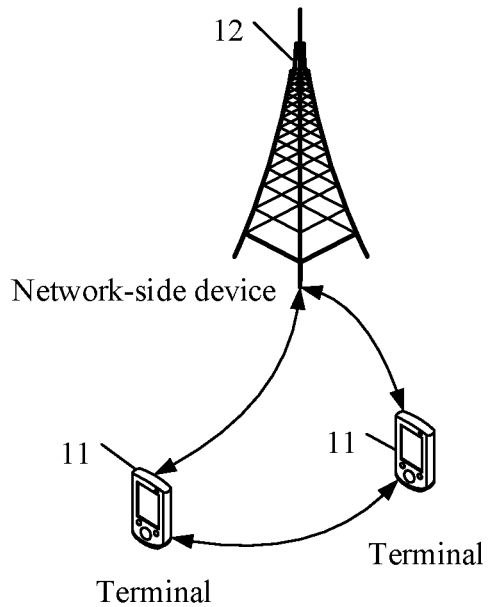
FIG. 1 is a structural diagram of a network system according to an embodiment of this application.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN (WLAN) access point, a wireless fidelity (Wi-Fi) node, a transmission reception point (TRP), or some other appropriate terms in the art. The base station is not limited to a specific technical term as long as the same technical effect is achieved. It should be noted that the base station in the NR system is taken merely as an example in the embodiments of this application, but the base station is not limited to any specific type.

The following describes in detail a measurement resource configuration method provided in the embodiments of this application by using specific embodiments and application scenarios thereof with reference to the accompanying drawings.

Figure 2:
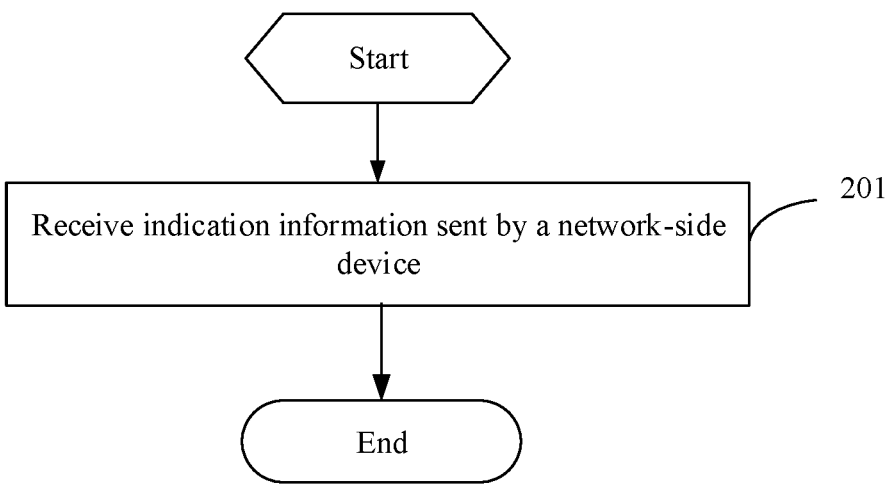
FIG. 2 is a flowchart of a measurement resource configuration method according to an embodiment of this application.

Referring to FIG. 2, FIG. 2 is a flowchart of a measurement resource configuration method according to an embodiment of this application. The measurement resource configuration method is executed by a terminal and includes the following step.

Step 201: Receive indication information sent by a network-side device, where the indication information is used to indicate configuration or modification information of a target channel state information CSI report configuration of the terminal.

The target channel state information (CSI) report configuration is a CSI report configuration that needs to be configured or modified, and the indication information may indicate configuration or modification information of one or more target CSI report configurations of the terminal. The indication information may be carried in radio resource control (RRC) signaling and/or media access control (MAC) control element (CE) signaling.

After the terminal receives the indication information, when the indication information is used for configuring the target CSI report configuration, the terminal may obtain all configuration information of the target CSI report based on the indication information carried in the RRC signaling, and then determine specific configuration information of the target CSI report configuration based on the indication information carried in the MAC CE, so as to perform reception, measurement, and reporting. When the indication information is used for modifying the target CSI report configuration, the terminal may perform reception, measurement, and reporting based on the target CSI report configuration and the indication information. For example, the terminal may modify the target CSI report configuration based on the indication information and perform reception, measurement, and reporting based on the modified target CSI report configuration, where the modification includes activation, deactivation, addition, deletion, or change. Alternatively, the terminal performs reception, measurement, and reporting based on the target CSI report configuration and the modification information in the indication information.

To be specific, in the case that reception, measurement, and reporting are to be performed based on the target CSI report configuration, the target CSI report is not modified, but the terminal preferentially performs reception, measurement, and reporting according to the modification information indicated in the indication information. The modification information is information for activating, deactivating, adding, deleting, or changing a measurement configuration in the target CSI report configuration.

In this embodiment, in a case that the network-side device is not configured or has been configured with the target CSI report configuration, if the network-side device needs to configure or adjust the receiving, measuring, and reporting behaviors of the terminal, the network-side device may send the configuration or modification information of the target CSI report configuration to the terminal based on the indication information, so as to configure or modify the target CSI report configuration, where the indication information may include only the configuration or modification information of the target CSI report configuration. This can implement flexible configuration and reduce signaling overheads.

The description "if xxxx, yyyy" in the embodiments of this application can be understood as "in a case of xxxx, yyyy is performed." For example, "if the network-side device needs to configure or adjust the receiving, measuring, and reporting behaviors of the terminal, the network-side device may send the configuration or modification information of the target CSI report configuration to the terminal based on the indication information" can be understood as "in a case that the network-side device needs to configure or adjust the receiving, measuring, and reporting behaviors of the terminal, the network-side device may send the configuration or modification information of the target CSI report configuration to the terminal based on the indication information." In this embodiment, the terminal receives the indication information sent by the network-side device, where the indication information is used to indicate the configuration or modification information of the target channel state information CSI report configuration of the terminal; and the terminal configures or modifies the target CSI report configuration based on the configuration or modification information of the target CSI report configuration indicated in the indication information, implementing flexible configuration and reducing signaling overheads. In the preceding description, the indication information is used for configuring or modifying at least one of the following:

the number of channel measurement resources (CMR) configured by the target CSI report configuration, where CMRs and interference measurement resources (IMR) appear in pairs, so if the number of CMRs has been configured, the number of IMRs can be determined;

the number of joint measurement resource pairs configured by the target CSI report configuration;

a CMR state in the target CSI report configuration;

a CMR grouping mode configured by the target CSI report configuration;

a report quantity configured by the target CSI report configuration;

a quasi-co-location (QCL) assumption corresponding to a reference signal (RS) configured by the target CSI report configuration;

a measurement mapping mode between at least two resource sets, where all of the at least two resource sets are different resource sets configured by the target CSI report configuration, or each of the at least two resource sets is associated with a different CSI report configuration, different CSI report configurations correspond to different TRPs, and one of the at least two resource sets is associated with the target CSI report configuration; or an association between the target CSI report configuration and a first CSI report configuration, where the terminal further includes the first CSI report configuration, and the target CSI report configuration corresponds to a different TRP than the first CSI report configuration.

Specifically, when the indication information includes configuration information for configuring the number of CMRs configured by the target CSI report configuration, the configuration may be implemented by configuring the number of non-zero power channel state information reference signal resources identifiers (NZP-CSI-RS-Resource Id) in a non-zero power channel state information reference signal resources (NZP-CSI-RS-Resources) field in a higher layer parameter non-zero power channel state information reference signal resource set (NZP-CSI-RS-Resource Set). In addition, the number of CMRs may alternatively be configured by configuring the CMR state in the target CSI report configuration, where the CMR state may be in measurement or not in measurement, the number of CMRs is increased by one if the CMR state is in measurement, and the number of CMRs is decreased by one if the CMR state is not in measurement. The CMR state may be indicated by a field already present or newly added in the target CSI report configuration. For example, the CMR state may be indicated by a field already present or newly added in a higher layer parameter non-zero power channel state information reference signal resource (NZP-CSI-RS-Resource).

In a case that the indication information is used for modifying the number of CMRs configured by the target CSI report configuration, the number of CMRs configured by the target CSI report configuration may be changed by adding or deleting a non-zero power channel state information reference signal resources identifier (NZP-CSI-RS-Resource Id) in a non-zero power channel state information reference signal resources (NZP-CSI-RS-Resources) field in a higher layer parameter non-zero power channel state information reference signal resource set (NZP-CSI-RS-Resource Set). In addition, the number of CMRs may alternatively be configured by configuring the CMR state in the target CSI report configuration, where the CMR state may be in measurement or not in measurement, the number of CMRs is increased by one if the CMR state is in measurement, and the number of CMRs is decreased by one if the CMR state is not in measurement. The CMR state may be indicated by a field already present or newly added in the target CSI report configuration. For example, the CMR state may be indicated by a field already present or newly added in a higher layer parameter non-zero power channel state information reference signal resource (NZP-CSI-RS-Resource).

In a case that the target CSI report configuration corresponds to multiple TRPs, the CMRs configured by the target CSI report configuration can be grouped to obtain at least two resource groups. In a case that the target CSI report configuration corresponds to one TRP, the CMRs configured by the target CSI report configuration are grouped into one group, and the CMRs configured by the target CSI report configuration can be configured or modified by configuring or modifying the CMR grouping mode configured by the target CSI report configuration.

In the case that the target CSI report configuration corresponds to multiple TRPs, the at least two resource sets are different resource groups configured by the target CSI report configuration. In the case that the target CSI report configuration corresponds to one TRP, each of the at least two resource sets is associated with a different CSI report configuration, different CSI report configurations correspond to different TRPs, and one of the at least two resource sets is associated with the target CSI report configuration. In this case, the configuring or modifying the measurement mapping mode is configuring or modifying the measurement mapping mode between CMRs in the target CSI report configuration and CMRs in another CSI report configuration of the terminal, where the target CSI report configuration corresponds to a different TRP than the another CSI report configuration of the terminal.

In the preceding description, the at least two resource sets include a first resource set and a second resource set, and the measurement mapping mode includes:

a one-to-one mapping between CMRs in the first resource set and CMRs in the second resource set, which may be understood that the CMRs in the first resource set are one-to-one mapped to the CMRs in the second resource set according to corresponding locations or according to any location; or a one-to-many mapping between CMRs in the first resource set and CMRs in the second resource set; or a many-to-many mapping between CMRs in the first resource set and CMRs in the second resource set; or no mapping between CMRs in the first resource set and CMRs in the second resource set; or a one-to-one mapping, one-to-many mapping, or many-to-one mapping between first CMRs in the first resource set and second CMRs in the second resource set, and no mapping between third CMRs in the first resource set and CMRs in another resource set of the at least two resource sets; or a one-to-one mapping, one-to-many mapping, or many-to-one mapping between first CMRs in the first resource set and second CMRs in the second resource set, and no mapping between fourth CMRs in the second resource set and CMRs in another resource set of the at least two resource sets; or a one-to-one mapping, one-to-many mapping, or many-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets.

In a case that the measurement mapping mode is a one-to-one mapping, one-to-many mapping, or many-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different. In a case that the third CMRs in the first resource set and the first CMRs in the first resource set are the same, the terminal receives and measures the CMRs according to a multiple transmission and reception points (Multi-TRP, MTRP) transmission assumption and a single transmission and reception point (Single-TRP, STRP) transmission assumption, and receives and measures the second CMRs in the second resource set according to a non-coherent joint transmission (NCJT) transmission assumption. In a case that the third CMRs in the first resource set and the first CMRs in the first resource set are different, the terminal receives and measures the third CMRs in the first resource set according to an STRP transmission assumption, and receives and measures the first CMRs in the first resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, and that there is no mapping between fourth CMRs in the second resource set and CMRs in another resource set of the at least two resource sets, the fourth CMRs in the second resource set and the second CMRs in the second resource set may be the same or different. In a case that the fourth CMRs in the second resource set and the second CMRs in the second resource set are the same, the terminal receives and measures the CMRs according to an MTRP transmission assumption and an STRP transmission assumption, and receives and measures the first CMRs in the first resource set according to an MTRP transmission assumption. In a case that the fourth CMRs in the second resource set and the second CMRs in the second resource set are different, the terminal receives and measures the fourth CMRs in the second resource set according to an STRP transmission assumption, and receives and measures the fourth CMRs in the second resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, that there is no mapping between third CMRs in the first resource set and CMRs in another resource set of the at least two resource sets, and that there is no mapping between fourth CMRs in the second resource set and CMRs in another resource set of the at least two resource sets, the third CMRs in the first resource set and the first CMRs in the first resource set may be the same or different, and the fourth CMRs in the second resource set and the second CMRs in the second resource set may be the same or different. In a case that the third CMRs in the first resource set and the first CMRs in the first resource set are the same and that the fourth CMRs in the second resource set and the second CMRs in the second resource set are the same, the terminal receives and measures the third CMRs in the first resource set and the fourth CMRs in the second resource set according to the MTRP transmission assumption and the STRP transmission assumption. In a case that the third CMRs in the first resource set and the first CMRs in the first resource set are the same and that the fourth CMRs in the second resource set and the second CMRs in the second resource set are different, the terminal receives and measures the third CMRs in the first resource set according to the MTRP transmission assumption and the STRP transmission assumption, receives and measures the second CMRs in the second resource set according to the MTRP transmission assumption, and receives and measures the fourth CMRs in the second resource set according to the STRP transmission assumption. In a case that the third CMRs in the first resource set and the first CMRs in the first resource set are different and that the fourth CMRs in the second resource set and the second CMRs in the second resource set are the same, the terminal receives and measures the fourth CMRs in the second resource set according to the MTRP transmission assumption and the STRP transmission assumption, receives and measures the first CMRs in the first resource set according to the MTRP transmission assumption, and receives and measures the third CMRs in the first resource set according to the STRP transmission assumption. In a case that the third CMRs in the first resource set and the first CMRs in the first resource set are different and that the fourth CMRs in the second resource set and the second CMRs in the second resource set are different, the terminal receives and measures the fourth CMRs in the second resource set according to the STRP transmission assumption, receives and measures the third CMRs in the first resource set according to the STRP transmission assumption, and receives and measures the first CMRs in the first resource set and the second CMRs in the second resource set according to the MTRP transmission assumption.

When performing reception and measurement according to the MTRP transmission assumption, the terminal performs an NCJT CSI measurement or MTRP beam pair measurement; and when performing reception and measurement according to the STRP transmission assumption, the terminal performs an STRP CSI measurement or STRP beam measurement.

The resources having the same resource identifiers are the same resources.

In the case that the target CSI report configuration corresponds to one TRP, the first resource set or the second resource set may be a CMR set configured by the target CSI report configuration.

Figure 2A:
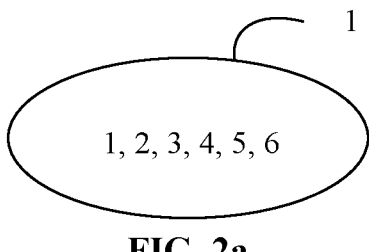
FIG. 2*a* and FIG. 2*b* are schematic diagrams of a resource set according to an embodiment of this application.
Figure 2B:
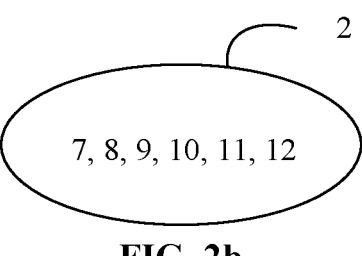

For example, in the case that the target CSI report configuration corresponds to multiple TRPs, first resource set 1 corresponds to a first resource group in the target CSI report configuration, and second resource set 2 corresponds to a second resource group in the target CSI report configuration; and in the case that the target CSI report configuration corresponds to one TRP, first resource set 1 corresponds to channel measurement resources in the target CSI report configuration, and second resource set 2 corresponds to channel measurement resources in another CSI report configuration, the target CSI report configuration corresponding to a different TRP than the another CSI report configuration. FIG. 2a shows channel measurement resources included in first resource set 1, and FIG. 2b shows channel measurement resources included in second resource set 2. A mapping relationship between first resource set 1 and second resource set 2 may be:

a one-to-one mapping, meaning that one resource in first resource set 1 corresponds to one resource in second resource set 2, where the one-to-one mapping includes: a mapping between corresponding locations, for example, resource 1 and resource 7; a mapping between non-corresponding locations, for example, resource 2 and resource 7; and a mapping between any locations, which is a one-to-one mapping regardless of whether the locations correspond to each other or not;

a one-to-many mapping, meaning that one resource in first resource set 1 corresponds to multiple resources in second resource set 2, for example, (resource 1, [resource 7, resource 8]);

a many-to-many mapping, meaning that multiple resources in first resource set 1 correspond to multiple resources in second resource set 2, for example, ([resource 1, resource 6], [resource 7, resource 8]); and no mapping relationship, meaning that there is no correspondence between any one of resources in first resource set 1 and any one of resources in second resource set 2.

Figure 2C:
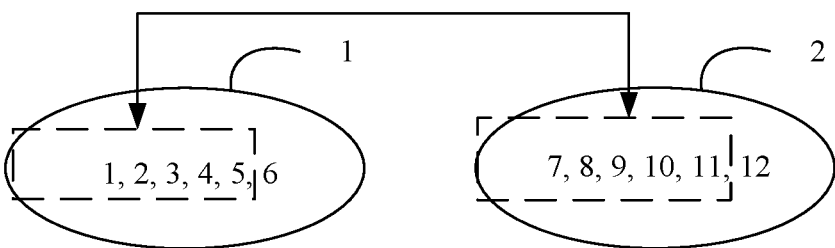
FIG. 2*c* is a schematic diagram of a mapping relationship between resource sets according to an embodiment of this application.

A resource set may also include resources that have no mapping relationship with another resource set, for example, resource 6 and resource 12 shown in FIG. 2c. In FIG. 2c, resources in the resource set other than resource 6 and resource 12 have a location-based one-to-one mapping relationship and the number N of joint measurement resource pairs is equal to 5. When obtaining a measurement mapping relationship shown in FIG. 2c according to the indication information, the terminal performs an NCJT CSI measurement or MTRP beam pair measurement for joint measurement resource pairs (1, 7), (2, 8), (3, 9), (4, 10), and (5, 11) separately according to the MTRP transmission assumption, and performs an STRP CSI measurement or STRP beam measurement for resources 6 and 12 separately according to the STRP transmission assumption.

Figure 2D:
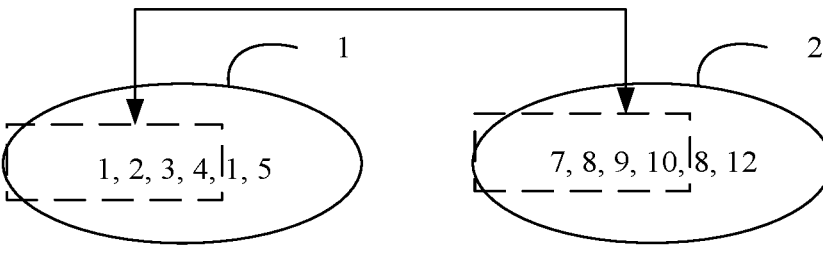
FIG. 2*d* is a schematic diagram of another mapping relationship between resource sets according to an embodiment of this application.

A resource in a resource set with no mapping relationship with another resource set and a resource in the resource set with a mapping relationship with another resource set may be a same resource, for example, resource 8 and resource 1 shown in FIG. 2d. In FIG. 2d, resource 8 has a location-based one-to-one mapping relationship with resource 2, and may also have no mapping relationship with resources 1 to 5, resource 1 has a location-based one-to-one mapping relationship with resource 7, and may also have no mapping relationship with resources 7 to 12, and the number N of joint measurement resource pairs is equal to 4. When obtaining a measurement mapping relationship shown in FIG. 2c according to the indication information, the terminal performs an NCJT CSI measurement or MTRP beam pair measurement for joint measurement resource pairs (1, 7), (2, 8), (3, 9), and (4, 10) separately according to the MTRP transmission assumption, and performs an STRP CSI measurement or STRP beam measurement for resources 1, 5 8, and 12 separately according to the STRP transmission assumption. For resources having both a mapping relationship and no mapping relationship, such as resources 1 and 8 in FIG. 2d, the terminal performs a channel measurement only once for them according to the STRP or MTRP transmission assumption.

The measurement mapping mode is indicated by a field already present or newly added in the target CSI report configuration. For example, the measurement mapping mode may be indicated by a field already present or newly added in a higher layer parameter CSI report configuration (CSI-ReportConfig).

Further, the measurement mapping mode is determined based on the number of valid resource sets in the at least two resource sets, the number of joint measurement resource pairs, and a report quantity configured by a CSI report configuration associated with the at least two resource sets; or the measurement mapping mode is determined based on the number of valid resource sets in the at least two resource sets, the number of joint measurement resource pairs, a report quantity configured by a CSI report configuration associated with the at least two resource sets; and an association between associated CSI report configurations.

Further, the number of joint measurement resource pairs is indicated by a field defined or newly added in the target CSI report configuration. For example, the number of joint measurement resource pairs may be indicated by a field defined or newly added in a higher layer parameter CSI-ReportConfig.

If a resource set includes a valid CMR, the resource set is a valid resource set. If the target CSI-ReportConfig is configured with the CMR state (that is, including a field for configuring a CMR state) and the CMR state includes in measurement and not in measurement, a CMR in measurement is considered a valid CMR; and if the target CSI-ReportConfig is not configured with the CMR state (that is, not including a field for configuring a CMR state), a CMR configured by the target CSI report configuration is considered a valid CMR.

In the case that the target CSI report configuration corresponds to multiple TRPs, if the number of valid resource sets in the at least two resource sets is greater than 2, the measurement mapping mode between the resource sets is determined based on CSI report configurations associated with the at least two resource sets, and specifically, based on the number of joint measurement resource pairs and the report quantity configured by the target CSI report configuration. In this case, some of the resources in different resource sets of the at least two resource sets have a mapping relationship with each other.

For example, in the case that the target CSI report configuration corresponds to multiple TRPs, the target CSI report configuration is configured with at least two resource sets, each resource set at least includes resources from one TRP. If the at least two resource sets are all valid resource sets, a mapping relationship between the resource sets can be implicitly determined based on the number of joint measurement resource pairs and the report quantity.

If the report quantity is a channel state information reference signal resource indicator-reference signal received power (CSI-RS Resource Indicator-Reference Signal Received Power, cri-RSRP) or a channel state information reference signal resource indicator-signal-to-noise ratio (CSI-RS Resource Indicator-Signal-to-Noise and Interference Ratio, cri-SINR) and the number of joint measurement resource pairs (set to N, which applies in the following description) is less than the number of resources in the resource set, the first N resources in each resource set are configured to be one-to-one mapped at any location, and the rest of the resources have no mapping relationship. The first N resources in each resource set cannot be configured with resources with the same resource identifiers, and the first N resources in each resource set can have the same resource identifiers as the rest resources in the set.

If the report quantity is a mode indicated by a related parameter such as channel state information reference signal resource indicator-rank indicator-channel quality indicator (cri-RI-CQI) or channel state information reference signal resource indicator-rank indicator-precoding matrix indicator-channel quality indicator (cri-RI-PMI-CQI CSI) and the number N of joint measurement resource pairs is less than the number of resources in the resource set, the first N resources in each resource set are configured to be one-to-one mapped at corresponding locations, and the rest of the resources have no mapping relationship. The first N resources in each resource set cannot be configured with resources with the same resource identifiers, and the first N resources in each resource set can have the same resource identifiers as the rest resources in the set.

In the case that the target CSI report configuration corresponds to one TRP, the target CSI report configuration and other CSI report configurations of the terminal correspond to different TRPs, and the at least two resource sets include a resource set configured by the target CSI report configuration and a resource set configured by another CSI report configuration. If the resource set configured by the target CSI report configuration and the resource set configured by the another CSI report configuration are both valid resource sets, a mapping relationship between the resource sets can be implicitly determined based on the association, the number of joint measurement resource pairs, and the report quantity. For example, if the target CSI report configuration and the another CSI report configuration have no association, there is no mapping relationship between the resource set configured by the target CSI report configuration and the resource set configured by the another CSI report configuration; and if the target CSI report configuration and the another CSI report configuration have an association, the mapping relationship may be implicitly configured based on the number of joint measurement resource pairs and the report quantity. For example, if the report quantity is cri-RSRP or cri-SINK and the number N of joint measurement resource pairs is less than the number of resources in the resource set, the first N resources in each resource set are configured to be one-to-one mapped at any location, and the rest of the resources have no mapping relationship. The first N resources in each resource set cannot be configured with resources with the same resource identifiers, and the first N resources in each resource set can have the same resource identifiers as the rest resources in the set.

If the report quantity is a mode indicated by a related parameter for CSI feedback such as cri-RI-CQI or cri-RI-PMI-CQI, and the number N of joint measurement resource pairs is less than the number of resources in the resource set, the first N resources in each resource set are configured to be one-to-one mapped at corresponding locations, and the rest of the resources have no mapping relationship. The first N resources in each resource set cannot be configured with resources with the same resource identifiers, and the first N resources in each resource set can have the same resource identifiers as the rest resources in the set.

In addition, the measurement mapping mode may alternatively be set based on the number of valid resource sets in the at least two resource sets in the following manner:

in the case that the target CSI report configuration corresponds to multiple TRPs, the CMRs included in the target CSI report configuration can be grouped into multiple resource groups, with each resource group including resources from at least one TRP.

Grouping mode specifies whether the CMRs in the target CSI report configuration are grouped into one or more resource groups.

Quantity is the number of CMRs in each resource group.

In a case that the number of resource groups configured or modified by the network-side device is greater than 2, and that at least two resource groups include valid CMRs, UE accordingly performs reception, measurement, and reporting according to a mapping relationship between resources in the valid resource groups, and specifically, for example, when the number N of joint measurement resource pairs is 0, performing reception, measurement and reporting for each valid CMR according to the STRP transmission assumption;

when the number N of joint measurement resource pairs is greater than 0 and there is no valid resource having both a mapping relationship and no mapping relationship in any resource group, performing reception, measurement and reporting for the N pairs of CMRs according to the MTRP transmission assumption, and performing reception, measurement and reporting for the rest valid CMRs in each resource group according to the STRP transmission assumption; and when the number N of joint measurement resource pairs is greater than 0 and there is at least one valid resource having both a one-to-one mapping and no mapping relationship in all resource groups, performing channel measurement for the valid resource with both a one-to-one mapping and no mapping relationship only once according to the MTRP and STRP transmission assumptions, performing reception, measurement and reporting for the N pairs of CMRs according to the MTRP transmission assumption, and performing reception, measurement and reporting for the rest valid CMRs in each resource group according to the STRP transmission assumption.

In a case that the number of resource groups configured or modified by the network-side device is greater than 2, and that only one resource group includes a valid CMR, the network-side device may determine the mapping relationship between resource groups in any one of the following manners:

configuring or modifying the mapping relationships between all resource groups to no mapping; and not changing the mapping relationship between the resource groups.

The behaviors of the UE corresponding to the preceding two manners are as follows:

the UE performs reception, measurement and reporting according to the configured or modified mapping relationship;

when the UE receives the indication information and determines that there is only one valid resource group, the UE performs reception, measurement and reporting according to the no-mapping mode by default; and if the target CSI report configuration indicates that no valid CMR is included in any resource group, the UE does not perform reception, measurement, and reporting.

In the case that the target CSI report configuration corresponds to one TRP, measurement, reception, and reporting of multiple TRPs can be implemented based on multiple CSI report configurations (where the multiple CSI report configurations include the target CSI report configuration and other CSI report configurations), where the multiple CSI report configurations correspond to different TRPs and the multiple CSI report configurations have an association with each other.

When the number of multiple CSI report configurations configured or modified by the network-side device is greater than 2, and at least two interrelated CSI report configurations in the multiple CSI report configurations include valid CMRs, the UE accordingly performs reception, measurement, and reporting according to a mapping relationship between resources configured by the two interrelated CSI report configurations;

in the following cases, the UE performs reception, measurement, and reporting according to the no-mapping mode:

the number of multiple CSI report configurations configured or modified by the network-side device is greater than 2 and only one of the multiple CSI report configurations includes valid CMRs;

the number of multiple CSI report configurations configured or modified by the network-side device is greater than 2, at least two of the multiple CSI report configurations include valid CMRs, but there is no association between the multiple CSI report configurations including valid CMRs; and the number of CSI report configurations configured or modified by the network-side device is equal to 1;

in the following cases, the UE does not perform reception, measurement, and reporting:

the number of multiple CSI report configurations configured or modified by the network-side device is greater than 0 and none of the multiple CSI report configurations includes a valid CMR; and the number of CSI report configurations configured or modified by the network-side device is equal to 0.

Further, the association is indicated by a field defined or newly added in the target CSI report configuration. For example, the association may be indicated by a field defined or newly added in a higher layer parameter CSI-ReportConfig. In a case that the target CSI report configuration and the first CSI report configuration have an association, the target CSI report configuration and the first CSI report configuration satisfy the following condition:

fields defined or newly added in the target CSI report configuration and the first CSI report configuration have the same indications;

or the field defined or newly added in the target CSI report configuration indicates the first CSI report configuration and the field defined or newly added in the first CSI report configuration indicates the target CSI report configuration;

or

CMRs in the target CSI report configuration are indicated as IMRs in the first CSI report configuration by a field defined or newly added in the target CSI report configuration, and CMRs in the first CSI report configuration is indicated as IMRs in the target CSI report configuration by a field defined or newly added in the first CSI report configuration;

or a MAC CE indication field for indicating the association indicates the target CSI report configuration and the first CSI report configuration. For example, whether there is an association between the target CSI report configuration and the first CSI report configuration may be explicitly or implicitly configured through RRC signaling or may be configured through RRC signaling and indicated by a MAC CE.

Explicit configuration through RRC signaling may include the following two manners:

configuring multiple CSI report configurations with the same association identifiers (Identifier, ID) to be associated with each other; to be specific, an association ID configured for the target CSI report configuration is the same as an association ID configured for the first CSI report configuration, and the association ID may be indicated by a field already present or newly added in the target CSI report configuration; and configuring an ID of an associated CSI report configuration in each CSI report configuration, that is, configuring an ID of the first CSI report configuration in the target CSI report configuration.

Implicit configuration through RRC signaling is: in each CSI report configuration, configuring a CMR configured by an associated CSI report configuration as an IMR in the current CSI report configuration, that is, configuring a CMR in the target CSI report configuration as an IMR in the first CSI report configuration, and configuring a CMR in the first CSI report configuration as an IMR in the target CSI report configuration.

The configuration through RRC signaling and indication via MAC CE are that:

all associations that can be configured for the terminal are configured to the terminal through RRC signaling, and then a specific association is determined through a MAC CE. For example, the network-side device configures four CSI report configurations (that is, CSI Report Configuration) to the terminal through RRC signaling, and if only two CSI report configurations can be selected for association, there are seven cases, as shown in Table 1.

TABLE 1

| | |
|---|---|
| 0 | Any two CSI report configurations have no association |
| 1 | CSI Report Configuration 1, CSI Report Configuration 2 |
| 2 | CSI Report Configuration 1, CSI Report Configuration 3 |
| 3 | CSI Report Configuration 1, CSI Report Configuration 4 |
| 4 | CSI Report Configuration 2, CSI Report Configuration 3 |
| 5 | CSI Report Configuration 2, CSI Report Configuration 4 |
| 6 | CSI Report Configuration 3, CSI Report Configuration 4 |

An association_report_configuration field can be defined in MAC CE to indicate an association between CSI Report configurations. A size of the association_report_configuration field is determined based on the number of association types. When the number of association types is 7, the size of the field is $\rceil \log_2 7 \lceil$, that is, 3 bits. The specific report quantity of CSI report configuration can be determined by these 3 bits, and the specific correspondence is shown in Table 2.

TABLE 2

| | |
|---|---|
| 000 | Any two CSI report configurations have no association |
| 001 | CSI Report Configuration 1, CSI Report Configuration 2 |
| 010 | CSI Report Configuration 1, CSI Report Configuration 3 |
| 011 | CSI Report Configuration 1, CSI Report Configuration 4 |
| 100 | CSI Report Configuration 2, CSI Report Configuration 3 |
| 101 | CSI Report Configuration 2, CSI Report Configuration 4 |
| 110 | CSI Report Configuration 3, CSI Report Configuration 4 |

In a case that the terminal receives a MAC CE and the association_report_configuration field is "001", the terminal can determine that CSI Report Configuration 1 and CSI Report Configuration 2 have an association.

The receiving, by the terminal from the network-side device, the indication information that is used for configuring the target CSI report configuration includes:

receiving RRC signaling and MAC CE signaling, where the RRC signaling is used for configuring multiple measurement configurations in the target CSI report configuration, and the MAC CE signaling is used for indicating one or at least two of the multiple measurement configurations; and performing reception, measurement, and reporting according to the one or at least two measurement configurations indicated by the MAC CE signaling, such that the UE can more flexibly switch between STRP and multiple transmission and reception points (Multi-TRP, MTRP).

When only the RRC signaling is received, the UE side may determine a specific measurement configuration based on the RRC signaling and perform reception, measurement, and reporting according to the measurement configuration in the RRC.

The measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

When the network-side device needs to modify the receiving, measuring, and reporting behaviors of the terminal based on the feedback from the terminal or the scheduling of the network-side device itself, the network-side device may modify the target CSI report configuration by performing reconfiguration through RRC signaling or performing direct modification through MAC CE signaling, so as to complete adjustment of the behaviors of the terminal. The reconfiguration through RRC signaling means that parameter values of only part of configuration information of the target CSI report configuration are carried in RRC signaling for modifying the corresponding configuration information in the target CSI report configuration.

The indication information is carried in the RRC signaling or MAC CE signaling, and the network-side device can modify, based on the indication information, the measurement configuration configured by the target CSI report configuration. After the terminal receives the RRC signaling or MAC CE signaling, the modification can be made in the following ways:

modifying the target CSI report configuration according to modification information indicated in the RRC signaling or MAC CE signaling, and performing reception, measurement, and reporting according to the modified target CSI report configuration, where the modification information may be modification information for all or part of the measurement configurations configured by the target CSI report configuration.

The reception, measurement, and reporting are performed based on the target CSI report configuration and the indication information in the RRC signaling or MAC CE signaling, in which case the target CSI report configuration is not modified.

The following uses the report quantity as an example to describe the preceding modification manner:

the network-side device may modify the report quantity of the terminal to "csi-CRI-PMI-CQI" through signaling information "report quantity=csi-CRI-PMI-CQI" carried in RRC signaling or MAC CE signaling; and after receiving the RRC signaling or MAC CE signaling, the terminal may modify the report quantity in the following manner:

modifying a value of the report quantity field in the target CSI report configuration to "csi-CRI-PMI-CQI"; or not modifying the value of the report quantity field in the target CSI report configuration, but directly performing reception, measurement, and reporting according to the report quantity "csi-CRI-PMI-CQI".

The measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

Multiple measurement configurations are configured through RRC signaling, and then one or at least two of the multiple measurement configurations are indicated through a MAC CE. The following uses the report quantity as an example for illustration.

All report quantities are configured through RRC:

The network-side device configures eight report quantities for the terminal through RRC, as shown in Table 3.

TABLE 3

| | |
|---|---|
| 1 | none |
| 2 | cri-RSRP |
| 3 | ssb-Index-RSRP |
| 4 | cri-RI-CQI |
| 5 | cri-RI-i1 |
| 6 | cri-RI-i1-CQI |

TABLE 3-continued

| 7 | cri-RI-PMI-CQI |
|---|---|
| 8 | cri-RI-LI-PMI-CQI |

The MAC CE indicates and determines a specific report quantity:

A report_quantity_indicator field defined in the MAC CE is used to indicate the report quantity of the target CSI report configuration. A size of the report_quantity_indicator field is determined based on the number of report quantity types. When the number of report quantity types is 8, the size of the field is log 2(8), that is, 3 bits. The specific report quantity of the target CSI report configuration is determined by these 3 bits, and the specific correspondence is shown in Table 4. Table 4 shows a correspondence between values of the report_quantity_indicator field and report quantities.

TABLE 4

| 000 | none |
|---|---|
| 001 | cri-RSRP |
| 010 | ssb-Index-RSRP |
| 011 | cri-RI-CQI |
| 100 | cri-RI-i1-CQI |
| 101 | cri-RI-i1-CQI |
| 110 | cri-RI-PMI-CQI |
| 111 | cri-RI-LI-PMI-CQI |

In a case that the terminal has received the MAC CE signaling and the report_quantity_indicator field is "001", the terminal can determine that the report quantity of the target CSI report configuration is "cri-RSRP".

In this application, in a case that one CSI report configuration corresponds to multiple TRPs, CSI-RS resources configured by the CSI report configuration can be grouped into multiple groups, and the number of CMRs in each group, the number of joint measurement beam pairs, a report quantity, and a measurement pairing mode of CMRs between different groups can be configured or modified through the RRC signaling or MAC CE signaling, so as to configure or change the receiving, measuring and reporting behaviors of the UE side.

In a case that multiple associated CSI report configurations are configured and one CSI report configuration corresponds to one TRP, and the number of CMRs in each CSI report configuration, the number of joint measurement beam pairs, a report quantity, an association between CSI report configurations, and a measurement pairing mode of CMRs between the CSI report configurations are configured or modified through RRC signaling or MAC CE signaling, so as to configure or change the receiving, measuring, and reporting behaviors of the UE side.

Figure 3:
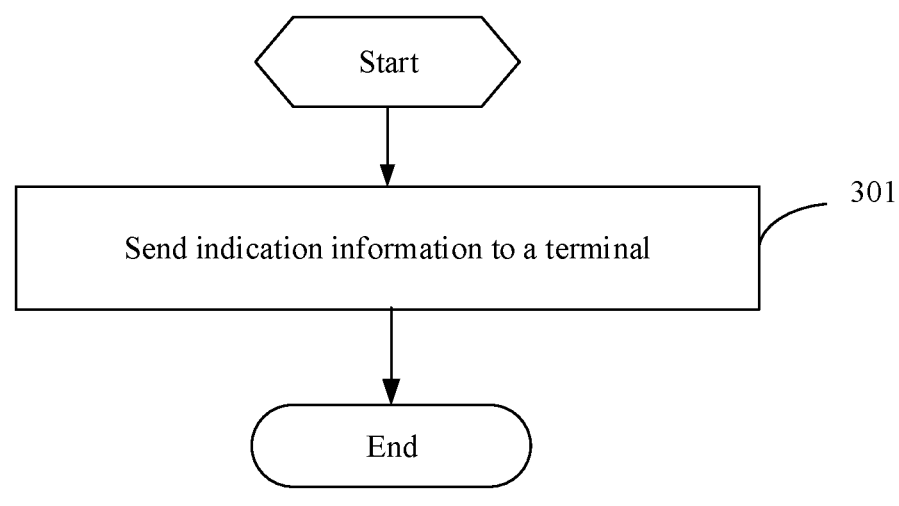
FIG. 3 is another flowchart of a measurement resource configuration method according to an embodiment of this application.

Referring to FIG. 3, FIG. 3 is another flowchart of a measurement resource configuration method according to an embodiment of this application. The measurement resource configuration method is executed by a network-side device and includes the following step.

Step 301: Send indication information to a terminal, where the indication information is used to indicate configuration or modification information of a target channel state information CSI report configuration of the terminal.

The target channel state information (CSI) report configuration is a CSI report configuration that needs to be configured or modified, and the indication information may indicate configuration or modification information of one or more target CSI report configurations of the terminal. The indication information may be carried in radio resource control (RRC) signaling or MAC CE signaling.

After the terminal receives the indication information, when the indication information is used for configuring the target CSI report configuration, the terminal may obtain configuration information of the target CSI report configuration based on the indication information, so as to perform reception, measurement, and reporting. When the indication information is used for modifying the target CSI report configuration, the terminal may perform reception, measurement, and reporting based on the target CSI report configuration and the indication information. For example, the terminal may modify the target CSI report configuration based on the indication information and perform reception, measurement, and reporting based on the modified target CSI report configuration, where the modification includes activation, deactivation, addition, deletion, or change. Alternatively, the terminal performs reception, measurement, and reporting based on the target CSI report configuration and the modification information in the indication information. To be specific, in the case that reception, measurement, and reporting are to be performed based on the target CSI report configuration, the target CSI report is not modified, but the terminal preferentially performs reception, measurement, and reporting according to the modification information indicated in the indication information. The modification information is information for activating, deactivating, adding, deleting, or changing a measurement configuration in the target CSI report configuration.

In a case that the network-side device is not configured or has been configured with the target CSI report configuration, if the network-side device needs to configure or adjust the receiving, measuring, and reporting behaviors of the terminal, the network-side device may send the configuration or modification information of the target CSI report configuration to the terminal based on the indication information, so as to configure or modify the target CSI report configuration, where the indication information may include only the configuration or modification information of the target CSI report configuration. This can reduce signaling overheads and implement flexible configuration.

In the embodiments of this application, the network-side device sends the indication information to the terminal, where the indication information is used to indicate configuration or modification information of a target channel state information CSI report configuration of the terminal; and the terminal configures or modifies the target CSI report configuration based on the configuration or modification information of the target CSI report configuration indicated in the indication information, reducing signaling overheads.

In the preceding description, the indication information is used for configuring or modifying at least one of the following:

the number of channel measurement resources CMR configured by the target CSI report configuration;

the number of joint measurement resource pairs configured by the target CSI report configuration;

a CMR state in the target CSI report configuration;

a CMR grouping mode configured by the target CSI report configuration;

a report quantity configured by the target CSI report configuration;

a QCL assumption corresponding to an RS configured by the target CSI report configuration;

a measurement mapping mode between at least two resource sets, where all of the at least two resource sets are different resource sets configured by the target CSI report configuration, or each of the at least two resource sets is associated with a different CSI report configuration, different CSI report configurations correspond to different transmission and reception points TRPs, and one of the at least two resource sets is associated with the target CSI report configuration; or an association between the target CSI report configuration and a first CSI report configuration, where the terminal further includes the first CSI report configuration, and the target CSI report configuration corresponds to a different TRP than the first CSI report configuration.

Specifically, when the indication information is used for configuring the number of CMRs configured by the target CSI report configuration, the configuration may be implemented by configuring the number of non-zero power channel state information reference signal resources identifiers (NZP-CSI-RS-Resource Id) in a non-zero power channel state information reference signal resources (NZP-CSI-RS-Resources) field in a higher layer parameter non-zero power channel state information reference signal resource set (NZP-CSI-RS-Resource Set). In addition, the number of CMRs may alternatively be configured by configuring the CMR state in the target CSI report configuration, where the CMR state may be in measurement or not in measurement, the number of CMRs is increased by one if the CMR state is in measurement, and the number of CMRs is decreased by one if the CMR state is not in measurement. The CMR state may be indicated by a field already present or newly added in the target CSI report configuration. For example, the CMR state may be indicated by a field already present or newly added in a higher layer parameter non-zero power channel state information reference signal resource (NZP-CSI-RS-Resource).

In a case that the indication information is used for modifying the number of CMRs configured by the target CSI report configuration, the number of CMRs configured by the target CSI report configuration may be changed by adding or deleting a non-zero power channel state information reference signal resources identifier (NZP-CSI-RS-Resource Id) in a non-zero power channel state information reference signal resources (NZP-CSI-RS-Resources) field in a higher layer parameter non-zero power channel state information reference signal resource set (NZP-CSI-RS-Resource Set). In addition, the number of CMRs may alternatively be configured by configuring the CMR state in the target CSI report configuration, where the CMR state may be in measurement or not in measurement, the number of CMRs is increased by one if the CMR state is in measurement, and the number of CMRs is decreased by one if the CMR state is not in measurement. The CMR state may be indicated by a field already present or newly added in the target CSI report configuration. For example, the CMR state may be indicated by a field already present or newly added in a higher layer parameter non-zero power channel state information reference signal resource (NZP-CSI-RS-Resource).

In a case that the target CSI report configuration corresponds to multiple TRPs, the CMRs configured by the target CSI report configuration can be grouped to obtain at least two resource groups, with each resource group including resources from at least one TRP. In a case that the target CSI report configuration corresponds to one TRP, the CMRs configured by the target CSI report configuration are grouped into one group, and the CMRs configured by the target CSI report configuration can be configured or modified by configuring or modifying the CMR grouping mode configured by the target CSI report configuration.

In the case that the target CSI report configuration corresponds to multiple TRPs, the at least two resource sets are different resource groups configured by the target CSI report configuration. In the case that the target CSI report configuration corresponds to one TRP, each of the at least two resource sets is associated with a different CSI report configuration, different CSI report configurations correspond to different TRPs, and one of the at least two resource sets is associated with the target CSI report configuration. In this case, the configuring or modifying the measurement mapping mode is configuring or modifying the measurement mapping mode between CMRs in the target CSI report configuration and CMRs in another CSI report configuration of the terminal, where the target CSI report configuration corresponds to a different TRP than the another CSI report configuration of the terminal.

In the preceding description, the at least two resource sets include a first resource set and a second resource set, and the measurement mapping mode includes:

a one-to-one mapping between CMRs in the first resource set and CMRs in the second resource set, which may be understood that the CMRs in the first resource set are one-to-one mapped to the CMRs in the second resource set according to corresponding locations or according to any location; or a one-to-many mapping between CMRs in the first resource set and CMRs in the second resource set; or a many-to-many mapping between CMRs in the first resource set and CMRs in the second resource set; or no mapping between CMRs in the first resource set and CMRs in the second resource set; or a one-to-one mapping, one-to-many mapping, or many-to-one mapping between first CMRs in the first resource set and second CMRs in the second resource set, and no mapping between third CMRs in the first resource set and CMRs in another resource set of the at least two resource sets; or a one-to-one mapping, one-to-many mapping, or many-to-one mapping between first CMRs in the first resource set and second CMRs in the second resource set, and no mapping between fourth CMRs in the second resource set and CMRs in another resource set of the at least two resource sets; or a one-to-one mapping, one-to-many mapping, or many-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets.

In a case that the measurement mapping mode is a one-to-one mapping, one-to-many mapping, or many-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different. In a case that the third CMRs in the first resource set and the first CMRs in the first resource set are the same, the terminal receives and measures the CMRs according to an MTRP transmission assumption and an STRP transmission assumption, and receives and measures the second CMRs in the second resource set according to an NCJT transmission assumption. In a case that the third CMRs in the first resource set and the first CMRs in the first resource set are different, the terminal receives and measures the third CMRs in the first resource set according to an STRP transmission assumption, and receives and measures the first CMRs in the first resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, and that there is no mapping between fourth CMRs in the second resource set and CMRs in another resource set of the at least two resource sets, the fourth CMRs in the second resource set and the second CMRs in the second resource set may be the same or different. In a case that the fourth CMRs in the second resource set and the second CMRs in the second resource set are the same, the terminal receives and measures the CMRs according to an MTRP transmission assumption and an STRP transmission assumption, and receives and measures the first CMRs in the first resource set according to an MTRP transmission assumption. In a case that the fourth CMRs in the second resource set and the second CMRs in the second resource set are different, the terminal receives and measures the fourth CMRs in the second resource set according to an STRP transmission assumption, and receives and measures the fourth CMRs in the second resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, that there is no mapping between third CMRs in the first resource set and CMRs in another resource set of the at least two resource sets, and that there is no mapping between fourth CMRs in the second resource set and CMRs in another resource set of the at least two resource sets, the third CMRs in the first resource set and the first CMRs in the first resource set may be the same or different, and the fourth CMRs in the second resource set and the second CMRs in the second resource set may be the same or different. In a case that the third CMRs in the first resource set and the first CMRs in the first resource set are the same and that the fourth CMRs in the second resource set and the second CMRs in the second resource set are the same, the terminal receives and measures the third CMRs in the first resource set and the fourth CMRs in the second resource set according to the MTRP transmission assumption and the STRP transmission assumption. In a case that the third CMRs in the first resource set and the first CMRs in the first resource set are the same and that the fourth CMRs in the second resource set and the second CMRs in the second resource set are different, the terminal receives and measures the third CMRs in the first resource set according to the MTRP transmission assumption and the STRP transmission assumption, receives and measures the second CMRs in the second resource set according to the MTRP transmission assumption, and receives and measures the fourth CMRs in the second resource set according to the STRP transmission assumption. In a case that the third CMRs in the first resource set and the first CMRs in the first resource set are different and that the fourth CMRs in the second resource set and the second CMRs in the second resource set are the same, the terminal receives and measures the fourth CMRs in the second resource set according to the MTRP transmission assumption and the STRP transmission assumption, receives and measures the first CMRs in the first resource set according to the MTRP transmission assumption, and receives and measures the third CMRs in the first resource set according to the STRP transmission assumption. In a case that the third CMRs in the first resource set and the first CMRs in the first resource set are different and that the fourth CMRs in the second resource set and the second CMRs in the second resource set are different, the terminal receives and measures the fourth CMRs in the second resource set according to the STRP transmission assumption, receives and measures the third CMRs in the first resource set according to the STRP transmission assumption, and receives and measures the first CMRs in the first resource set and the second CMRs in the second resource set according to the MTRP transmission assumption.

When performing reception and measurement according to the MTRP transmission assumption, the terminal performs an NCJT CSI measurement or MTRP beam pair measurement; and when performing reception and measurement according to the STRP transmission assumption, the terminal performs an STRP CSI measurement or STRP beam measurement.

The resources having the same resource identifiers are the same resources.

In the case that the target CSI report configuration corresponds to one TRP, the first resource set or the second resource set may be a CMR set configured by the target CSI report configuration.

For example, in the case that the target CSI report configuration corresponds to multiple TRPs, first resource set 1 corresponds to a first resource group in the target CSI report configuration, and second resource set 2 corresponds to a second resource group in the target CSI report configuration; and in the case that the target CSI report configuration corresponds to one TRP, first resource set 1 corresponds to channel measurement resources in the target CSI report configuration, and second resource set 2 corresponds to channel measurement resources in another CSI report configuration, the target CSI report configuration corresponding to a different TRP than the another CSI report configuration. FIG. 2a shows channel measurement resources included in first resource set 1, and FIG. 2b shows channel measurement resources included in second resource set 2. A mapping relationship between first resource set 1 and second resource set 2 may be:

a one-to-one mapping, meaning that one resource in first resource set 1 corresponds to one resource in second resource set 2, where the one-to-one mapping includes: a mapping between corresponding locations, for example, resource 1 and resource 7; a mapping between non-corresponding locations, for example, resource 2 and resource 7; and a mapping between any locations, which is a one-to-one mapping regardless of whether the locations correspond to each other or not;

a one-to-many mapping, meaning that one resource in first resource set 1 corresponds to multiple resources in second resource set 2, for example, (resource 1, [resource 7, resource 8]);

a many-to-many mapping, meaning that multiple resources in first resource set 1 correspond to multiple resources in second resource set 2, for example, ([resource 1, resource 6], [resource 7, resource 8]); and no mapping relationship, meaning that there is no correspondence between any one of resources in first resource set 1 and any one of resources in second resource set 2.

A resource set may also include resources that have no mapping relationship with another resource set, for example, resource 6 and resource 12 shown in FIG. 2c. In FIG. 2c, resources in the resource set other than resource 6 and resource 12 have a location-based one-to-one mapping relationship and the number N of joint measurement resource pairs is equal to 5. When obtaining a measurement mapping relationship shown in FIG. 2c according to the indication information, the terminal performs an NCJT CSI measurement or MTRP beam pair measurement for joint measurement resource pairs (1, 7), (2, 8), (3, 9), (4, 10), and (5, 11) separately according to the MTRP transmission assumption, and performs an STRP CSI measurement or STRP beam measurement for resources 6 and 12 separately according to the STRP transmission assumption.

A resource in a resource set with no mapping relationship with another resource set and a resource in the resource set with a mapping relationship with another resource set may be a same resource, for example, resource 8 and resource 1 shown in FIG. 2d. In FIG. 2d, resource 8 has a location-based one-to-one mapping relationship with resource 2, and may also have no mapping relationship with resources 1 to 5, resource 1 has a location-based one-to-one mapping relationship with resource 7, and may also have no mapping relationship with resources 7 to 12, and the number N of joint measurement resource pairs is equal to 4. When obtaining a measurement mapping relationship shown in FIG. 2c according to the indication information, the terminal performs an NCJT CSI measurement or MTRP beam pair measurement for joint measurement resource pairs (1, 7), (2, 8), (3, 9), and (4, 10) separately according to the MTRP transmission assumption, and performs an STRP CSI measurement or STRP beam measurement for resources 1, 5 8, and 12 separately according to the STRP transmission assumption. For resources having both a mapping relationship and no mapping relationship, such as resources 1 and 8 in FIG. 2d, the terminal performs a channel measurement only once for them according to the STRP or MTRP transmission assumption.

The measurement mapping mode is indicated by a field already present or newly added in the target CSI report configuration. For example, the measurement mapping mode may be indicated by a field already present or newly added in a higher layer parameter CSI-ReportConfig.

Further, the measurement mapping mode is determined based on the number of valid resource sets in the at least two resource sets, the number of joint measurement resource pairs, and a report quantity configured by a CSI report configuration associated with the at least two resource sets; or the measurement mapping mode is determined based on the number of valid resource sets in the at least two resource sets, the number of joint measurement resource pairs, a report quantity configured by a CSI report configuration associated with the at least two resource sets; and an association between associated CSI report configurations.

Further, the number of joint measurement resource pairs is indicated by a field defined or newly added in the target CSI report configuration. For example, the number of joint measurement resource pairs may be indicated by a field defined or newly added in a higher layer parameter CSI-ReportConfig.

If a resource set includes a valid CMR, the resource set is a valid resource set. If the target CSI-ReportConfig is configured with the CMR state (that is, including a field for configuring a CMR state) and the CMR state includes in measurement and not in measurement, a CMR in measurement is considered a valid CMR; and if the target CSI-ReportConfig is not configured with the CMR state (that is, not including a field for configuring a CMR state), a CMR configured by the target CSI report configuration is considered a valid CMR.

In the case that the target CSI report configuration corresponds to multiple TRPs, if the number of valid resource sets in the at least two resource sets is greater than 2, the measurement mapping mode between the resource sets is determined based on CSI report configurations associated with the at least two resource sets, and specifically, based on the number of joint measurement resource pairs and the report quantity configured by the target CSI report configuration. In this case, some of the resources in different resource sets of the at least two resource sets have a mapping relationship with each other.

For example, in the case that the target CSI report configuration corresponds to multiple TRPs, the target CSI report configuration is configured with at least two resource sets, each resource set at least includes resources from one TRP. If the at least two resource sets are all valid resource sets, a mapping relationship between the resource sets can be implicitly determined based on the number of joint measurement resource pairs and the report quantity.

If the report quantity is cri-RSRP or cri-SINR and the number N of joint measurement resource pairs is less than the number of resources in the resource set, the first N resources in each resource set are configured to be one-to-one mapped at any location, and the rest of the resources have no mapping relationship. The first N resources in each resource set cannot be configured with resources with the same resource identifiers, and the first N resources in each resource set can have the same resource identifiers as the rest resources in the set.

If the report quantity is a mode indicated by a CSI-related parameter such as cri-RI-CQI or cri-RI-PMI-CQI, and the number N of joint measurement resource pairs is less than the number of resources in the resource set, the first N resources in each resource set are configured to be one-to-one mapped at corresponding locations, and the rest of the resources have no mapping relationship. The first N resources in each resource set cannot be configured with resources with the same resource identifiers, and the first N resources in each resource set can have the same resource identifiers as the rest resources in the set.

In the case that the target CSI report configuration corresponds to one TRP, the target CSI report configuration and other CSI report configurations of the terminal correspond to different TRPs, and the at least two resource sets include a resource set configured by the target CSI report configuration and a resource set configured by another CSI report configuration. If the resource set configured by the target CSI report configuration and the resource set configured by the another CSI report configuration are both valid resource sets, a mapping relationship between the resource sets can be implicitly determined based on the association, the number of joint measurement resource pairs, and the report quantity. For example, if the target CSI report configuration and the another CSI report configuration have no association, there is no mapping relationship between the resource set configured by the target CSI report configuration and the resource set configured by the another CSI report configuration; and if the target CSI report configuration and the another CSI report configuration have an association, the mapping relationship may be implicitly configured based on the number of joint measurement resource pairs and the report quantity. For example, if the report quantity is cri-RSRP or cri-SINK and the number N of joint measurement resource pairs is less than the number of resources in the resource set, the first N resources in each resource set are configured to be one-to-one mapped at any location, and the rest of the resources have no mapping relationship. The first N resources in each resource set cannot be configured with resources with the same resource identifiers, and the first N resources in each resource set can have the same resource identifiers as the rest resources in the set.

If the report quantity is a mode indicated by a related parameter for CSI feedback such as cri-RI-CQI or cri-RI-PMI-CQI, and the number N of joint measurement resource pairs is less than the number of resources in the resource set, the first N resources in each resource set are configured to be one-to-one mapped at corresponding locations, and the rest of the resources have no mapping relationship. The first N resources in each resource set cannot be configured with resources with the same resource identifiers, and the first N resources in each resource set can have the same resource identifiers as the rest resources in the set. In addition, the measurement mapping mode may alternatively be set based on the number of valid resource sets in the at least two resource sets in the following manner:

in the case that the target CSI report configuration corresponds to multiple TRPs, the CMRs included in the target CSI report configuration can be grouped into multiple resource groups, with each resource group including resources from at least one TRP.

Grouping mode specifies whether the CMRs in the target CSI report configuration are grouped into one or more resource groups.

Quantity is the number of CMRs in each resource group.

In a case that the number of resource groups configured or modified by the network-side device is greater than 2, and that at least two resource groups include valid CMRs, UE accordingly performs reception, measurement, and reporting according to a mapping relationship between resources in the valid resource groups, and specifically, for example, when the number N of joint measurement resource pairs is 0, performing reception, measurement and reporting for each valid CMR according to the STRP transmission assumption;

when the number N of joint measurement resource pairs is greater than 0 and there is no valid resource having both a mapping relationship and no mapping relationship in any resource group, performing reception, measurement and reporting for the N pairs of CMRs according to the MTRP transmission assumption, and performing reception, measurement and reporting for the rest valid CMRs in each resource group according to the STRP transmission assumption; and when the number N of joint measurement resource pairs is greater than 0 and there is at least one valid resource having both a one-to-one mapping and no mapping relationship in all resource groups, performing channel measurement for the valid resource with both a one-to-one mapping and no mapping relationship only once according to the MTRP and STRP transmission assumptions, performing reception, measurement and reporting for the N pairs of CMRs according to the MTRP transmission assumption, and performing reception, measurement and reporting for the rest valid CMRs in each resource group according to the STRP transmission assumption.

In a case that the number of resource groups configured or modified by the network-side device is greater than 2, and that only one resource group includes a valid CMR, the network-side device may determine the mapping relationship between resource groups in any one of the following manners:

configuring or modifying the mapping relationships between all resource groups to no mapping; and not changing the mapping relationship between the resource groups.

The behaviors of the UE corresponding to the preceding two manners are as follows:

the UE performs reception, measurement and reporting according to the configured or modified mapping relationship;

when the UE receives the indication information and determines that there is only one valid resource group, the UE performs reception, measurement and reporting according to the no-mapping mode by default; and if the target CSI report configuration indicates that no valid CMR is included in any resource group, the UE does not perform reception, measurement, and reporting.

In the case that the target CSI report configuration corresponds to one TRP, measurement, reception, and reporting of multiple TRPs can be implemented based on multiple CSI report configurations (where the multiple CSI report configurations include the target CSI report configuration and other CSI report configurations), where the multiple CSI report configurations correspond to different TRPs and the multiple CSI report configurations have an association with each other.

When the number of multiple CSI report configurations configured or modified by the network-side device is greater than 2, and at least two interrelated CSI report configurations in the multiple CSI report configurations include valid CMRs, the UE accordingly performs reception, measurement, and reporting according to a mapping relationship between resources configured by the two interrelated CSI report configurations;

in the following cases, the UE performs reception, measurement, and reporting according to the no-mapping mode:

the number of multiple CSI report configurations configured or modified by the network-side device is greater than 2 and only one of the multiple CSI report configurations includes valid CMRs;

the number of multiple CSI report configurations configured or modified by the network-side device is greater than 2, at least two of the multiple CSI report configurations include valid CMRs, but there is no association between the multiple CSI report configurations including valid CMRs; and the number of CSI report configurations configured or modified by the network-side device is equal to 1;

in the following cases, the UE does not perform reception, measurement, and reporting:

the number of multiple CSI report configurations configured or modified by the network-side device is greater than 0 and none of the multiple CSI report configurations includes a valid CMR; and the number of CSI report configurations configured or modified by the network-side device is equal to 0.

Further, the association is indicated by a field defined or newly added in the target CSI report configuration. For example, the association may be indicated by a field defined or newly added in a higher layer parameter CSI-ReportConfig.

In a case that the target CSI report configuration and the first CSI report configuration have an association, the target CSI report configuration and the first CSI report configuration satisfy the following condition:

fields defined or newly added in the target CSI report configuration and the first CSI report configuration have the same indications;

or the field defined or newly added in the target CSI report configuration indicates the first CSI report configuration and the field defined or newly added in the first CSI report configuration indicates the target CSI report configuration;

or

CMRs in the target CSI report configuration are indicated as IMRs in the first CSI report configuration by a field defined or newly added in the target CSI report configuration, and CMRs in the first CSI report configuration is indicated as IMRs in the target CSI report configuration by a field defined or newly added in the first CSI report configuration;

or a MAC CE indication field for indicating the association indicates the target CSI report configuration and the first CSI report configuration.

For example, whether there is an association between the target CSI report configuration and the first CSI report configuration may be explicitly or implicitly configured through RRC signaling or may be configured through RRC signaling and indicated by a MAC CE.

Explicit configuration through RRC signaling may include the following two manners:

configuring multiple CSI report configurations with the same association IDs to be associated with each other; to be specific, an association ID configured for the target CSI report configuration is the same as an association ID configured for the first CSI report configuration, and the association ID may be indicated by a field already present or newly added in the target CSI report configuration; and configuring an ID of an associated CSI report configuration in each CSI report configuration, that is, configuring an ID of the first CSI report configuration in the target CSI report configuration.

Implicit configuration through RRC signaling is: in each CSI report configuration, configuring a CMR configured by an associated CSI report configuration as an IMR in the current CSI report configuration, that is, configuring a CMR in the target CSI report configuration as an IMR in the first CSI report configuration, and configuring a CMR in the first CSI report configuration as an IMR in the target CSI report configuration.

The configuration through RRC signaling and indication via MAC CE are that:

all associations that can be configured for the terminal are configured to the terminal through RRC signaling, and then a specific association is determined through a MAC CE. For example, the network-side device configures four CSI report configurations (that is, CSI Report Configuration) to the terminal through RRC signaling, and if only two CSI report configurations can be selected for association, there are seven cases, as shown in Table 1.

An association_report_configuration field can be defined in MAC CE to indicate an association between CSI Report configurations. A size of the association_report_configuration field is determined based on the number of association types. When the number of association types is 7, the size of the field is $\rceil \log_2 7\lceil$, that is, 3 bits. The specific report quantity of CSI report configuration can be determined by these 3 bits, and the specific correspondence is shown in Table 2. In a case that the terminal receives a MAC CE and the association_report_configuration field is "001", the terminal can determine that CSI Report Configuration 1 and CSI Report Configuration 2 have an association.

The configuring, by the network-side device, the indication information of the target CSI report configuration includes:

configuring a MAC CE signaling indication through RRC signaling; where the RRC signaling is used for configuring multiple measurement configurations in the target CSI report configuration, and the MAC CE signaling is used for indicating one or at least two of the multiple measurement configurations; and performing reception, measurement, and reporting according to the one or at least two measurement configurations indicated by the MAC CE signaling;

or configuring measurement configuration information in the target CSI report configuration through RRC signaling only.

When the RRC signaling and MAC CE signaling are received, the UE side may determine all measurement configurations based on RRC signaling and perform reception, measurement, and reporting according to one or at least two measurement configurations indicated by a MAC CE.

When only the RRC signaling is received, the UE side may determine a specific measurement configuration based on the RRC signaling and perform reception, measurement, and reporting according to the measurement configuration in the RRC.

The measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

When the network-side device needs to modify the receiving, measuring, and reporting behaviors of the terminal based on the feedback from the terminal or the scheduling of the network-side device itself, the network-side device may modify the target CSI report configuration by performing reconfiguration through RRC signaling or performing direct modification through MAC CE signaling, so as to complete adjustment of the behaviors of the terminal.

The indication information is carried in the RRC signaling or MAC CE signaling, and the network-side device can modify, based on the indication information, the measurement configuration configured by the target CSI report configuration. After the terminal receives the RRC signaling or MAC CE signaling, the modification can be made in the following ways:

modifying the target CSI report configuration according to modification information indicated in the RRC signaling or MAC CE signaling, and performing reception, measurement, and reporting according to the modified target CSI report configuration, where the modification information may be modification information for all or part of the measurement configurations configured by the target CSI report configuration.

The reception, measurement, and reporting are performed based on the target CSI report configuration and the indication information in the RRC signaling or MAC CE signaling, in which case the target CSI report configuration is not modified.

The following uses the report quantity as an example to describe the preceding modification manner:

the network-side device may modify the report quantity of the terminal to "csi-CRI-PMI-CQI" through signaling information "report quantity=csi-CRI-PMI-CQI" carried in RRC signaling or MAC CE signaling; and after receiving the RRC signaling or MAC CE signaling, the terminal may modify the report quantity in the following manner:

modifying a value of the report quantity field in the target CSI report configuration to "csi-CRI-PMI-CQI"; or not modifying the value of the report quantity field in the target CSI report configuration, but directly performing reception, measurement, and reporting according to the report quantity "csi-CRI-PMI-CQI".

The indication information is carried in RRC signaling and MAC CE signaling, where the RRC signaling is used for configuring multiple measurement configurations in the target CSI report configuration, and the MAC CE signaling is used for indicating one or at least two of the multiple measurement configurations. The measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

Multiple measurement configurations are configured through RRC signaling, and then one or at least two of the multiple measurement configurations are indicated through a MAC CE. The following uses the report quantity as an example for illustration.

All report quantities are configured through RRC:

The network-side device configures eight report quantities for the terminal through RRC, as shown in Table 3.

The MAC CE indicates and determines a specific report quantity:

A report_quantity_indicator field defined in the MAC CE is used to indicate the report quantity of the target CSI report configuration. A size of the report_quantity_indicator field is determined based on the number of report quantity types. When the number of report quantity types is 8, the size of the field is log 2(8), that is, 3 bits. The specific report quantity of the target CSI report configuration is determined by these 3 bits, and the specific correspondence is shown in Table 4.

In a case that the terminal has received the MAC CE signaling and the report_quantity_indicator field is "001", the terminal can determine that the report quantity of the target CSI report configuration is "cri-RSRP".

It should be noted that the measurement resource configuration method provided in the embodiments of this application may be executed by a measurement resource configuration apparatus or a control module for performing the measurement resource configuration method in the measurement resource configuration apparatus.

In the following embodiment, assuming that the measurement resource configuration apparatus performs the measurement resource configuration method, the measurement resource configuration apparatus provided in the embodiments of this application is described.

Figure 4:
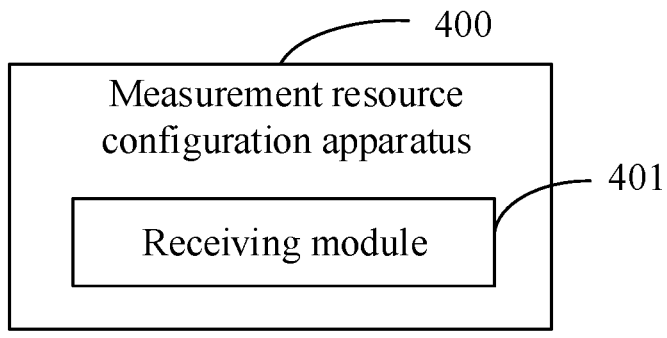
FIG. 4 is a structural diagram of a measurement resource configuration apparatus according to an embodiment of this application.

Referring to FIG. 4, FIG. 4 is a structural diagram of a measurement resource configuration apparatus according to an embodiment of this application. The measurement resource configuration apparatus 400 is applied to a terminal and includes:

a receiving module 401, configured to receive indication information sent by a network-side device, where the indication information is used to indicate configuration or modification information of a target channel state information CSI report configuration of the terminal.

Further, the indication information is used for configuring or modifying at least one of the following:

the number of channel measurement resources CMR configured by the target CSI report configuration;

the number of joint measurement resource pairs configured by the target CSI report configuration;

a CMR state in the target CSI report configuration;

a CMR grouping mode configured by the target CSI report configuration;

a report quantity configured by the target CSI report configuration;

a QCL assumption corresponding to an RS configured by the target CSI report configuration;

a measurement mapping mode between at least two resource sets, where all of the at least two resource sets are different resource sets configured by the target CSI report configuration, or each of the at least two resource sets is associated with a different CSI report configuration, different CSI report configurations correspond to different transmission and reception points TRPs, and one of the at least two resource sets is associated with the target CSI report configuration; or an association between the target CSI report configuration and a first CSI report configuration, where the terminal further includes the first CSI report configuration, and the target CSI report configuration corresponds to a different TRP than the first CSI report configuration.

Further, the at least two resource sets include a first resource set and a second resource set, and the measurement mapping mode includes:

a one-to-one mapping between CMRs in the first resource set and CMRs in the second resource set; or a one-to-many mapping between CMRs in the first resource set and CMRs in the second resource set; or a many-to-many mapping between CMRs in the first resource set and CMRs in the second resource set; or no mapping between CMRs in the first resource set and CMRs in the second resource set; or a one-to-one mapping, one-to-many mapping, or many-to-one mapping between first CMRs in the first resource set and second CMRs in the second resource set, and no mapping between third CMRs in the first resource set and CMRs in another resource set of the at least two resource sets; or a one-to-one mapping, one-to-many mapping, or many-to-one mapping between first CMRs in the first resource set and second CMRs in the second resource set, and no mapping between fourth CMRs in the second resource set and CMRs in another resource set of the at least two resource sets; or a one-to-one mapping, one-to-many mapping, or many-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets.

In a case that the measurement mapping mode is a one-to-one mapping, one-to-many mapping, or many-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different. In a case that the third CMRs in the first resource set and the first CMRs in the first resource set are the same, the terminal receives and measures the CMRs according to an MTRP transmission assumption and an STRP transmission assumption, and receives and measures the second CMRs in the second resource set according to an NCJT transmission assumption. In a case that the third CMRs in the first resource set and the first CMRs in the first resource set are different, the terminal receives and measures the third CMRs in the first resource set according to an STRP transmission assumption, and receives and measures the first CMRs in the first resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, and that there is no mapping between fourth CMRs in the second resource set and CMRs in another resource set of the at least two resource sets, the fourth CMRs in the second resource set and the second CMRs in the second resource set may be the same or different. In a case that the fourth CMRs in the second resource set and the second CMRs in the second resource set are the same, the terminal receives and measures the CMRs according to an MTRP transmission assumption and an STRP transmission assumption, and receives and measures the first CMRs in the first resource set according to an MTRP transmission assumption. In a case that the fourth CMRs in the second resource set and the second CMRs in the second resource set are different, the terminal receives and measures the fourth CMRs in the second resource set according to an STRP transmission assumption, and receives and measures the fourth CMRs in the second resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, that there is no mapping between third CMRs in the first resource set and CMRs in another resource set of the at least two resource sets, and that there is no mapping between fourth CMRs in the second resource set and CMRs in another resource set of the at least two resource sets, the third CMRs in the first resource set and the first CMRs in the first resource set may be the same or different, and the fourth CMRs in the second resource set and the second CMRs in the second resource set may be the same or different. In a case that the third CMRs in the first resource set and the first CMRs in the first resource set are the same and that the fourth CMRs in the second resource set and the second CMRs in the second resource set are the same, the terminal receives and measures the third CMRs in the first resource set and the fourth CMRs in the second resource set according to the MTRP transmission assumption and the STRP transmission assumption. In a case that the third CMRs in the first resource set and the first CMRs in the first resource set are the same and that the fourth CMRs in the second resource set and the second CMRs in the second resource set are different, the terminal receives and measures the third CMRs in the first resource set according to the MTRP transmission assumption and the STRP transmission assumption, receives and measures the second CMRs in the second resource set according to the MTRP transmission assumption, and receives and measures the fourth CMRs in the second resource set according to the STRP transmission assumption. In a case that the third CMRs in the first resource set and the first CMRs in the first resource set are different and that the fourth CMRs in the second resource set and the second CMRs in the second resource set are the same, the terminal receives and measures the fourth CMRs in the second resource set according to the MTRP transmission assumption and the STRP transmission assumption, receives and measures the first CMRs in the first resource set according to the MTRP transmission assumption, and receives and measures the third CMRs in the first resource set according to the STRP transmission assumption. In a case that the third CMRs in the first resource set and the first CMRs in the first resource set are different and that the fourth CMRs in the second resource set and the second CMRs in the second resource set are different, the terminal receives and measures the fourth CMRs in the second resource set according to the STRP transmission assumption, receives and measures the third CMRs in the first resource set according to the STRP transmission assumption, and receives and measures the first CMRs in the first resource set and the second CMRs in the second resource set according to the MTRP transmission assumption.

When performing reception and measurement according to the MTRP transmission assumption, the terminal performs an NCJT CSI measurement or MTRP beam pair measurement; and when performing reception and measurement according to the STRP transmission assumption, the terminal performs an STRP CSI measurement or STRP beam measurement.

Further, the measurement mapping mode is determined based on the number of valid resource sets in the at least two resource sets, the number of joint measurement resource pairs, and a report quantity configured by a CSI report configuration associated with the at least two resource sets; or the measurement mapping mode is determined based on the number of valid resource sets in the at least two resource sets, the number of joint measurement resource pairs, a report quantity configured by a CSI report configuration associated with the at least two resource sets; and an association between associated CSI report configurations.

Further, the number of joint measurement resource pairs is indicated by a field defined or newly added in the target CSI report configuration. For example, the number of joint measurement resource pairs may be indicated by a field defined or newly added in a higher layer parameter CSI-ReportConfig.

Further, the CMR state is indicated by a field already present or newly added in the target CSI report configuration.

Further, the measurement mapping mode is indicated by a field already present or newly added in the target CSI report configuration.

Further, the association is indicated by a field defined or newly added in the target CSI report configuration.

Further, in a case that the target CSI report configuration and the first CSI report configuration have an association, the target CSI report configuration and the first CSI report configuration satisfy the following condition:

fields defined or newly added in the target CSI report configuration and the first CSI report configuration have the same indications;

or the field defined or newly added in the target CSI report configuration indicates the first CSI report configuration and the field defined or newly added in the first CSI report configuration indicates the target CSI report configuration;

or

CMRs in the target CSI report configuration are indicated as IMRs in the first CSI report configuration by a field defined or newly added in the target CSI report configuration, and CMRs in the first CSI report configuration is indicated as IMRs in the target CSI report configuration by a field defined or newly added in the first CSI report configuration;

or a MAC CE indication field for indicating the association indicates the target CSI report configuration and the first CSI report configuration.

Further, the CMR state is in measurement or not in measurement.

Further, the indication information is carried in RRC signaling or MAC CE signaling.

Further, the indication information is carried in RRC signaling and MAC CE signaling, where the RRC signaling is used for configuring multiple measurement configurations in the target CSI report configuration, and the MAC CE signaling is used for indicating one or at least two of the multiple measurement configurations, and performing reception, measurement, and reporting based on the one or at least two measurement configurations indicated by the MAC CE signaling.

Further, the apparatus further includes:

a configuration module, configured to configure the target CSI report configuration according to the indication information, and perform reception, measurement, and reporting according to the configured target CSI report configuration;

Further, the apparatus further includes:

a modification module, configured to, in a case that the indication information is used to indicate modification information of a target CSI report configuration of the terminal, modify the target CSI report configuration according to the indication information, and perform reception, measurement, and reporting according to the modified target CSI report configuration;

or in a case that the indication information is used to indicate modification information of a target CSI report configuration of the terminal, perform reception, measurement, and reporting based on the target CSI report configuration and the modification information in the indication information.

Further, the measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

Further, the configuration or modification information is information for configuring, activating, deactivating, adding, deleting, or changing a measurement configuration in the target CSI report configuration.

The measurement resource configuration apparatus 400 in this embodiment of this application may be an apparatus, or may be a component, an integrated circuit, or a chip in a terminal.

The measurement resource configuration apparatus 400 in this embodiment of this application may be an apparatus having an operating system. The operating system may be an Android operating system, iOS operating system, or other possible operating system. This is not specifically limited in embodiments of this application.

The measurement resource configuration apparatus 400 provided in this embodiment of this application can implement the processes implemented by the method embodiment in FIG. 2, with the same technical effect achieved. To avoid repetition, details are not described herein again.

Figure 5:
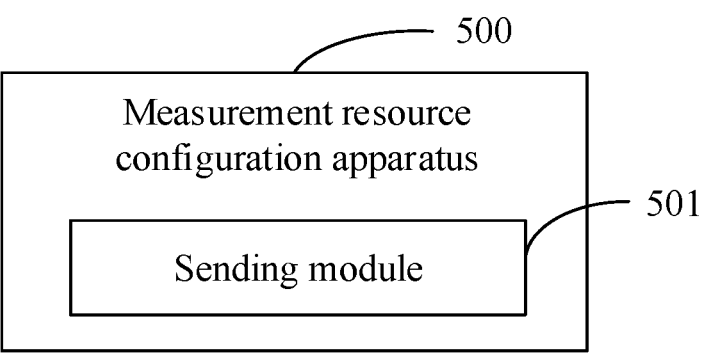
FIG. 5 is a structural diagram of a measurement resource configuration apparatus according to an embodiment of this application.

Referring to FIG. 5, FIG. 5 is a structural diagram of a measurement resource configuration apparatus according to an embodiment of this application. The measurement resource configuration apparatus 500 is executed by a network-side device and includes:

a sending module 501, configured to send indication information to a terminal, where the indication information is used to indicate configuration or modification information of a target channel state information CSI report configuration of the terminal.

Further, the indication information is used for configuring or modifying at least one of the following:

the number of channel measurement resources CMR configured by the target CSI report configuration;

the number of joint measurement resource pairs configured by the target CSI report configuration;

a CMR state in the target CSI report configuration;

a CMR grouping mode configured by the target CSI report configuration;

a report quantity configured by the target CSI report configuration;

a QCL assumption corresponding to an RS configured by the target CSI report configuration;

a measurement mapping mode between at least two resource sets, where all of the at least two resource sets are different resource sets configured by the target CSI report configuration, or each of the at least two resource sets is associated with a different CSI report configuration, different CSI report configurations correspond to different transmission and reception points TRPs, and one of the at least two resource sets is associated with the target CSI report configuration; or an association between the target CSI report configuration and a first CSI report configuration, where the terminal further includes the first CSI report configuration, and the target CSI report configuration corresponds to a different TRP than the first CSI report configuration.

Further, the at least two resource sets include a first resource set and a second resource set, and the measurement mapping mode includes:

a one-to-one mapping between CMRs in the first resource set and CMRs in the second resource set; or a one-to-many mapping between CMRs in the first resource set and CMRs in the second resource set; or a many-to-many mapping between CMRs in the first resource set and CMRs in the second resource set; or no mapping between CMRs in the first resource set and CMRs in the second resource set; or a one-to-one mapping, one-to-many mapping, or many-to-one mapping between first CMRs in the first resource set and second CMRs in the second resource set, and no mapping between third CMRs in the first resource set and CMRs in another resource set of the at least two resource sets; or a one-to-one mapping, one-to-many mapping, or many-to-one mapping between first CMRs in the first resource set and second CMRs in the second resource set, and no mapping between fourth CMRs in the second resource set and CMRs in another resource set of the at least two resource sets; or a one-to-one mapping, one-to-many mapping, or many-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets.

In a case that the measurement mapping mode is a one-to-one mapping, one-to-many mapping, or many-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different.

In a case that the measurement mapping mode is a one-to-one mapping, one-to-many mapping, or many-to-one mapping between first CMRs in the first resource set and second CMRs in the second resource set, and that there is no mapping between fourth CMRs in the second resource set and CMRs in another resource set of the at least two resource sets, the fourth CMRs in the second resource set and the second CMRs in the second resource set may be the same or different.

In a case that the measurement mapping mode is a one-to-one mapping, one-to-many mapping, or many-to-one mapping between first CMRs in the first resource set and second CMRs in the second resource set, that there is no mapping between third CMRs in the first resource set and CMRs in another resource set of the at least two resource sets, and that there is no mapping between fourth CMRs in the second resource set and CMRs in another resource set of the at least two resource sets, the third CMRs in the first resource set and the first CMRs in the first resource set may be the same or different, and the fourth CMRs in the second resource set and the second CMRs in the second resource set may be the same or different.

Further, the measurement mapping mode is determined based on the number of valid resource sets in the at least two resource sets, the number of joint measurement resource pairs, and a report quantity configured by a CSI report configuration associated with the at least two resource sets; or the measurement mapping mode is determined based on the number of valid resource sets in the at least two resource sets, the number of joint measurement resource pairs, a report quantity configured by a CSI report configuration associated with the at least two resource sets; and an association between associated CSI report configurations.

Further, the number of joint measurement resource pairs is indicated by a field already present or newly added in the target CSI report configuration.

Further, the CMR state is indicated by a field already present or newly added in the target CSI report configuration.

Further, the measurement mapping mode is indicated by a field already present or newly added in the target CSI report configuration.

Further, the association is indicated by a field defined or newly added in the target CSI report configuration.

Further, in a case that the target CSI report configuration and the first CSI report configuration have an association, the target CSI report configuration and the first CSI report configuration satisfy the following condition:

fields defined or newly added in the target CSI report configuration and the first CSI report configuration have the same indications;

or the field defined or newly added in the target CSI report configuration indicates the first CSI report configuration and the field defined or newly added in the first CSI report configuration indicates the target CSI report configuration;

or

CMRs in the target CSI report configuration are indicated as IMRs in the first CSI report configuration by a field defined or newly added in the target CSI report configuration, and CMRs in the first CSI report configuration is indicated as IMRs in the target CSI report configuration by a field defined or newly added in the first CSI report configuration;

or a MAC CE indication field for indicating the association indicates the target CSI report configuration and the first CSI report configuration.

Further, the CMR state is in measurement or not in measurement.

Further, the indication information is carried in RRC signaling or MAC CE signaling.

Further, the indication information is carried in RRC signaling and MAC CE signaling, where the RRC signaling is used for configuring multiple measurement configurations in the target CSI report configuration, and the MAC CE signaling is used for indicating one or at least two of the multiple measurement configurations.

Further, the configuration or modification information is information for configuring, activating, deactivating, adding, deleting, or changing a measurement configuration in the target CSI report configuration.

Further, the measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

The measurement resource configuration apparatus 500 provided in this embodiment of this application can implement the processes implemented by the method embodiment in FIG. 3, with the same technical effect achieved. To avoid repetition, details are not described herein again.

Figure 6:
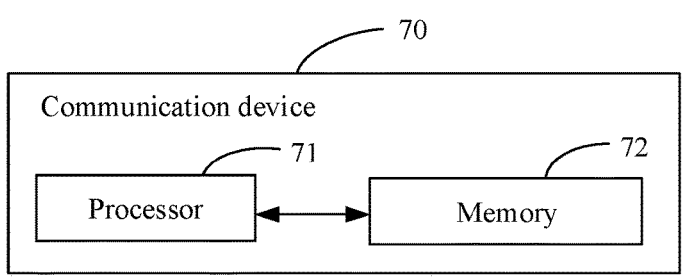
FIG. 6 is a structural diagram of a communication device according to an embodiment of this application.

Optionally, as shown in FIG. 6, an embodiment of this application further provides a communication device 70 including a processor 71, a memory 72, and a program or instructions stored in the memory 72 and capable of running on the processor 71. For example, in a case that the communication device 70 is a terminal, when the program or instructions are executed by the processor 71, the processes of the foregoing embodiment of the measurement resource configuration method show in FIG. 2 are implemented, with the same technical effects achieved. In a case that the communication device 70 is a network-side device, when the program or instructions are executed by the processor 71, the processes of the foregoing embodiment of the measurement resource configuration method shown in FIG. 3 are implemented, with the same technical effects achieved. To avoid repetition, details are not described herein again.

Figure 7:
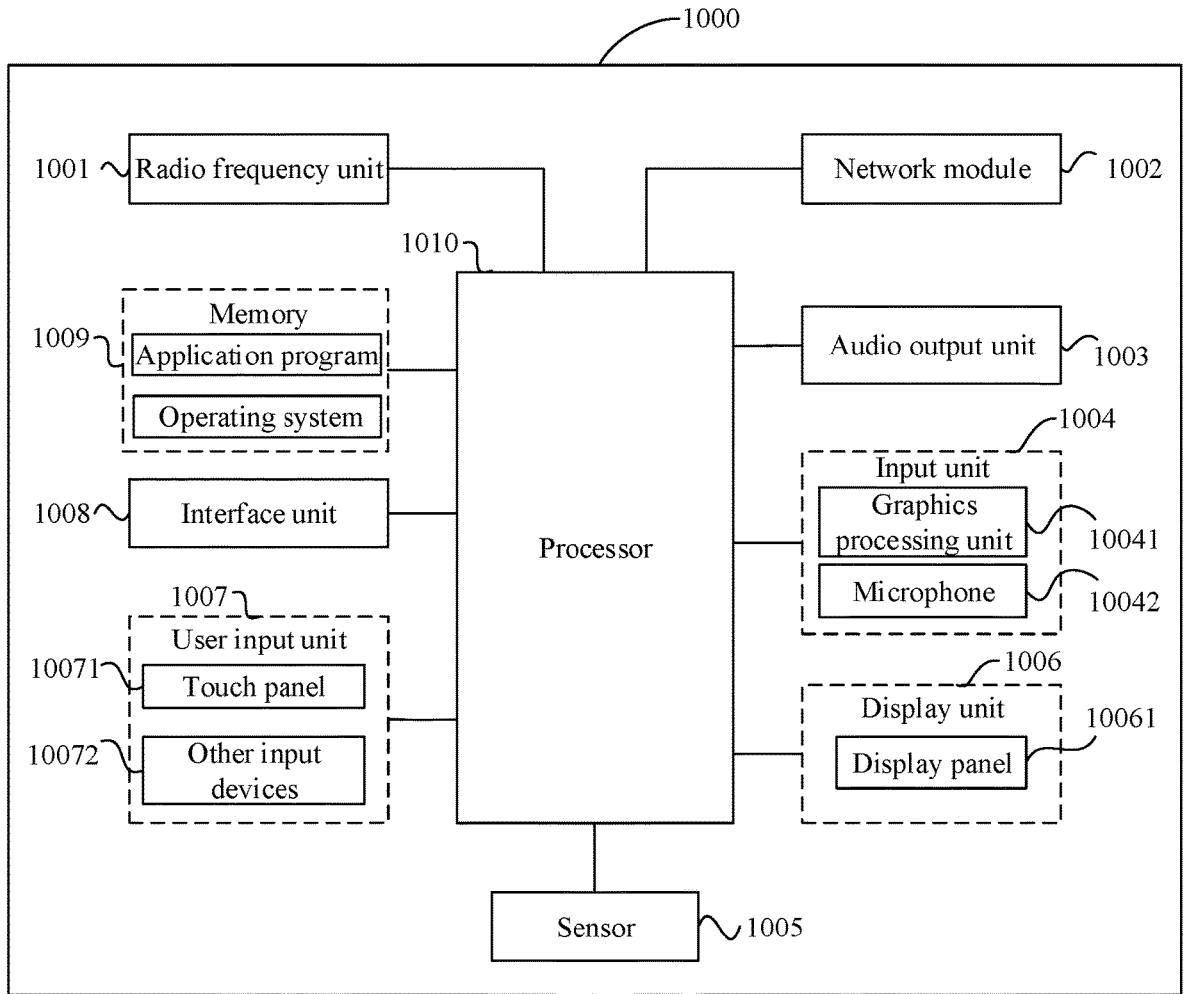
FIG. 7 is a structural diagram of a terminal according to an embodiment of this application.

FIG. 7 is a schematic diagram of a hardware structure of a terminal implementing an embodiment of this application.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

It can be understood by those skilled in the art that the terminal 1000 may further include a power supply (for example, a battery) supplying power to the components. The power supply may be logically connected to the processor 1010 via a power management system, so that functions such as charge management, discharge management, and power consumption management are implemented by using the power management system. The structure of the terminal shown in FIG. 7 does not constitute any limitation on the terminal, and the terminal may include more or fewer components than shown in the figure, or combine some of the components, or have different arrangements of the components. Details are not described herein.

It should be understood that in this embodiment of this application, the input unit 1004 may include a graphics processing unit (GPU) 10041 and a microphone 10042. The graphics processing unit 10041 processes image data of a static picture or a video that is obtained by an image capture apparatus (for example, a camera) in a video capture mode or an image capture mode. The display unit 1006 may include a display panel 10061. The display panel 10061 may be configured in a form of a liquid crystal display, an organic light-emitting diode display, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein.

In this embodiment of this application, the radio frequency unit 1001 receives downlink data from a network-side device and then transmits the downlink data to the processor 1010 for processing; and transmits uplink data to the base station. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may include a program or instruction storage area and a data storage area. The program or instruction storage area may store an operating system, an application program or instruction required by at least one function (for example, a sound playback function or an image playback function), and the like. In addition, the memory 1009 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The memory 109 may be, for example, at least one disk storage device, a flash memory device, or another non-volatile solid-state storage device.

The processor 1010 may include one or more processing units. Optionally, an application processor and a modem processor may be integrated in the processor 1010. The application processor primarily processes an operating system, user interfaces, application programs or instructions, and the like. The modem processor primarily processes radio communication, for example, being a baseband processor. It can be understood that the modem processor may alternatively be not integrated in the processor 1010.

The radio frequency unit 1001 is configured to receive indication information sent by a network-side device, where the indication information is used to indicate configuration or modification information of a target channel state information CSI report configuration of the terminal.

Further, the indication information is used for configuring or modifying at least one of the following:

the number of channel measurement resources CMR configured by the target CSI report configuration;

the number of joint measurement resource pairs configured by the target CSI report configuration;

a CMR state in the target CSI report configuration;

a CMR grouping mode configured by the target CSI report configuration;

a report quantity configured by the target CSI report configuration;

a QCL assumption corresponding to an RS configured by the target CSI report configuration;

a measurement mapping mode between at least two resource sets, where all of the at least two resource sets are different resource sets configured by the target CSI report configuration, or each of the at least two resource sets is associated with a different CSI report configuration, different CSI report configurations correspond to different transmission and reception points TRPs, and one of the at least two resource sets is associated with the target CSI report configuration; or an association between the target CSI report configuration and a first CSI report configuration, where the terminal further includes the first CSI report configuration, and the target CSI report configuration corresponds to a different TRP than the first CSI report configuration.

Further, the at least two resource sets include a first resource set and a second resource set, and the measurement mapping mode includes:

a one-to-one mapping between CMRs in the first resource set and CMRs in the second resource set; or a one-to-many mapping between CMRs in the first resource set and CMRs in the second resource set; or a many-to-many mapping between CMRs in the first resource set and CMRs in the second resource set; or no mapping between CMRs in the first resource set and CMRs in the second resource set; or a one-to-one mapping, one-to-many mapping, or many-to-one mapping between first CMRs in the first resource set and second CMRs in the second resource set, and no mapping between third CMRs in the first resource set and CMRs in another resource set of the at least two resource sets; or a one-to-one mapping, one-to-many mapping, or many-to-one mapping between first CMRs in the first resource set and second CMRs in the second resource set, and no mapping between fourth CMRs in the second resource set and CMRs in another resource set of the at least two resource sets; or a one-to-one mapping, one-to-many mapping, or many-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets.

In a case that the measurement mapping mode is a one-to-one mapping, one-to-many mapping, or many-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different. In a case that the third CMRs in the first resource set and the first CMRs in the first resource set are the same, the terminal receives and measures the CMRs according to an MTRP transmission assumption and an STRP transmission assumption, and receives and measures the second CMRs in the second resource set according to an NCH transmission assumption. In a case that the third CMRs in the first resource set and the first CMRs in the first resource set are different, the terminal receives and measures the third CMRs in the first resource set according to an STRP transmission assumption, and receives and measures the first CMRs in the first resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, and that there is no mapping between fourth CMRs in the second resource set and CMRs in another resource set of the at least two resource sets, the fourth CMRs in the second resource set and the second CMRs in the second resource set may be the same or different. In a case that the fourth CMRs in the second resource set and the second CMRs in the second resource set are the same, the terminal receives and measures the CMRs according to an MTRP transmission assumption and an STRP transmission assumption, and receives and measures the first CMRs in the first resource set according to an MTRP transmission assumption. In a case that the fourth CMRs in the second resource set and the second CMRs in the second resource set are different, the terminal receives and measures the fourth CMRs in the second resource set according to an STRP transmission assumption, and receives and measures the fourth CMRs in the second resource set and the second CMRs in the second resource set according to an MTRP transmission assumption.

In a case that the measurement mapping mode is a one-to-one mapping, one-to-many mapping, or many-to-one mapping between first CMRs in the first resource set and second CMRs in the second resource set, that there is no mapping between third CMRs in the first resource set and CMRs in another resource set of the at least two resource sets, and that there is no mapping between fourth CMRs in the second resource set and CMRs in another resource set of the at least two resource sets, the third CMRs in the first resource set and the first CMRs in the first resource set may be the same or different, and the fourth CMRs in the second resource set and the second CMRs in the second resource set may be the same or different. In a case that the third CMRs in the first resource set and the first CMRs in the first resource set are the same and that the fourth CMRs in the second resource set and the second CMRs in the second resource set are the same, the terminal receives and measures the third CMRs in the first resource set and the fourth CMRs in the second resource set according to the MTRP transmission assumption and the STRP transmission assumption. In a case that the third CMRs in the first resource set and the first CMRs in the first resource set are the same and that the fourth CMRs in the second resource set and the second CMRs in the second resource set are different, the terminal receives and measures the third CMRs in the first resource set according to the MTRP transmission assumption and the STRP transmission assumption, receives and measures the second CMRs in the second resource set according to the MTRP transmission assumption, and receives and measures the fourth CMRs in the second resource set according to the STRP transmission assumption. In a case that the third CMRs in the first resource set and the first CMRs in the first resource set are different and that the fourth CMRs in the second resource set and the second CMRs in the second resource set are the same, the terminal receives and measures the fourth CMRs in the second resource set according to the MTRP transmission assumption and the STRP transmission assumption, receives and measures the first CMRs in the first resource set according to the MTRP transmission assumption, and receives and measures the third CMRs in the first resource set according to the STRP transmission assumption. In a case that the third CMRs in the first resource set and the first CMRs in the first resource set are different and that the fourth CMRs in the second resource set and the second CMRs in the second resource set are different, the terminal receives and measures the fourth CMRs in the second resource set according to the STRP transmission assumption, receives and measures the third CMRs in the first resource set according to the STRP transmission assumption, and receives and measures the first CMRs in the first resource set and the second CMRs in the second resource set according to the MTRP transmission assumption.

When performing reception and measurement according to the MTRP transmission assumption, the terminal performs an NCJT CSI measurement or MTRP beam pair measurement; and when performing reception and measurement according to the STRP transmission assumption, the terminal performs an STRP CSI measurement or STRP beam measurement.

The resources having the same resource identifiers are the same resources.

Further, the measurement mapping mode is determined based on the number of valid resource sets in the at least two resource sets, the number of joint measurement resource pairs, and a report quantity configured by a CSI report configuration associated with the at least two resource sets; or the measurement mapping mode is determined based on the number of valid resource sets in the at least two resource sets, the number of joint measurement resource pairs, a report quantity configured by a CSI report configuration associated with the at least two resource sets; and an association between associated CSI report configurations.

Further, the number of joint measurement resource pairs is indicated by a field already present or newly added in the target CSI report configuration.

Further, the CMR state is indicated by a field already present or newly added in the target CSI report configuration.

Further, the measurement mapping mode is indicated by a field already present or newly added in the target CSI report configuration.

Further, the association is indicated by a field defined or newly added in the target CSI report configuration.

Further, in a case that the target CSI report configuration and the first CSI report configuration have an association, the target CSI report configuration and the first CSI report configuration satisfy the following condition:

fields defined or newly added in the target CSI report configuration and the first CSI report configuration have the same indications;

or the field defined or newly added in the target CSI report configuration indicates the first CSI report configuration and the field defined or newly added in the first CSI report configuration indicates the target CSI report configuration;

or

CMRs in the target CSI report configuration are indicated as IMRs in the first CSI report configuration by a field defined or newly added in the target CSI report configuration, and CMRs in the first CSI report configuration is indicated as IMRs in the target CSI report configuration by a field defined or newly added in the first CSI report configuration;

or a MAC CE indication field for indicating the association indicates the target CSI report configuration and the first CSI report configuration.

Further, the CMR state is in measurement or not in measurement.

Further, the indication information is carried in RRC signaling or MAC CE signaling.

Further, the indication information is carried in RRC signaling and MAC CE signaling, where the RRC signaling is used for configuring multiple measurement configurations in the target CSI report configuration, and the MAC CE signaling is used for indicating one or at least two of the multiple measurement configurations, and the processor 1010 is further configured to perform reception, measurement, and reporting based on the one or at least two measurement configurations indicated by the MAC CE signaling.

Further, the processor 1010 is further configured to:

in a case that the indication information is used to indicate configuration information of a target CSI report configuration of the terminal, perform reception, measurement, and reporting according to the target CSI report configuration configured by the indication information;

in a case that the indication information is used to indicate modification information of a target CSI report configuration of the terminal, modify the target CSI report configuration according to the indication information, and perform reception, measurement, and reporting according to the modified target CSI report configuration;

or in a case that the indication information is used to indicate modification information of a target CSI report configuration of the terminal, perform reception, measurement, and reporting based on the target CSI report configuration and the modification information in the indication information.

The processor 1010 is further configured to perform reception, measurement, and reporting according to the one or at least two of the measurement configurations indicated by the MAC CE signaling.

Further, the measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

Further, the configuration or modification information is information for configuring, activating, deactivating, adding, deleting, or changing a measurement configuration in the target CSI report configuration.

The terminal 1000 provided in this embodiment of this application can realize the processes realized in the method embodiment of FIG. 2 with the same technical effects achieved. To avoid repetition, details are not described herein again.

Figure 8:
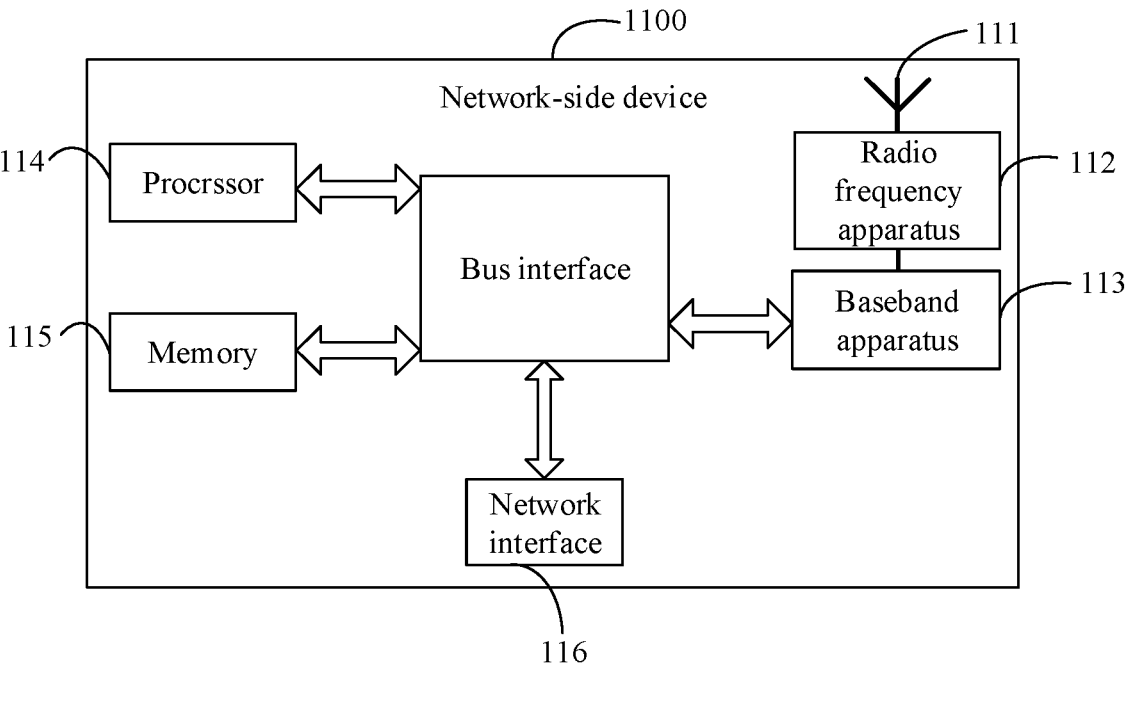
FIG. 8 is a structural diagram of a network-side device according to an embodiment of this application.

Specifically, an embodiment of this application further provides a network-side device. As shown in FIG. 8, the network-side device 1100 includes an antenna 111, a radio frequency apparatus 112, and a baseband apparatus 113. The antenna 111 is connected to the radio frequency apparatus 112. In an uplink direction, the radio frequency apparatus 112 receives information by using the antenna 111, and sends the received information to the baseband apparatus 113 for processing. In a downlink direction, the baseband apparatus 113 processes to-be-sent information, and sends the information to the radio frequency apparatus 112; and the radio frequency apparatus 112 processes the received information and then sends the information out by using the antenna 111.

The frequency band processing apparatus may be located in the baseband apparatus 113. The method executed by the network-side device in the foregoing embodiments may be implemented in the baseband apparatus 113, and the baseband apparatus 113 includes a processor 114 and a memory 115.

The baseband apparatus 113 may include, for example, at least one baseband processing unit, where multiple chips are disposed on the baseband processing unit. As shown in FIG. 8, one of the chips is, for example, the processor 114, connected to the memory 115, to invoke a program in the memory 115 to perform the operation of the network shown in the foregoing method embodiment.

The baseband apparatus 113 may further include a network interface 116, configured to exchange information with the radio frequency apparatus 112, where the interface is, for example, a common public radio interface (CPRI).

Specifically, the network-side device in this embodiment of the present invention further includes: instructions or a program stored in the memory 115 and capable of running on the processor 114. The processor 114 invokes the instructions or program in the memory 115 to execute the method executed by the modules shown in FIG. 5, with the same technical effects achieved. To avoid repetition, details are not described herein again.

An embodiment of this application further provides a readable storage medium. The readable storage medium may be non-volatile or volatile. The readable storage medium stores a program or instructions. When the program or instructions are executed by a processor, each process of the foregoing method embodiment shown in FIG. 2 or FIG. 3 is implemented, with the same technical effect achieved. To avoid repetition, details are not described again herein described herein again.

The processor is a processor in the terminal or the network-side device in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions for a network-side device, to implement the processes of the method embodiments shown in FIG. 2 and FIG. 3, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product is stored in a non-transitory readable storage medium. When the computer program product is executed by at least one processor, the processes of the foregoing method embodiment shown in FIG. 2 or FIG. 3 are implemented, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

The invention claimed is:

1. A measurement resource configuration method, executed by a terminal, wherein the method comprises:
   receiving indication information sent by a network-side device, wherein the indication information is used to indicate configuration or modification information of a target channel state information CSI report configuration of the terminal;
   the indication information is used for configuring or modifying the following:
   a measurement mapping mode between at least two resource sets, wherein all of the at least two resource sets are different resource sets configured by the target CSI report configuration;
   the at least two resource sets comprise a first resource set and a second resource set, and the measurement mapping mode comprises:
   a one-to-one mapping between CMRs in the first resource set and CMRs in the second resource set; or
   no mapping between CMRs in the first resource set and CMRs in the second resource set; or
   a one-to-one mapping between first CMRs in the first resource set and second CMRs in the second resource set, and no mapping between third CMRs in the first resource set and CMRs in another resource set of the at least two resource sets; or
   a one-to-one mapping between first CMRs in the first resource set and second CMRs in the second resource set, and no mapping between fourth CMRs in the second resource set and CMRs in another resource set of the at least two resource sets; or
   a one-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets;
   in a case that the measurement mapping mode is a one-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different; and
   in a case that the measurement mapping mode is a one-to-one mapping between first CMRs in the first resource set and second CMRs in the second resource set, the fourth CMRs in the second resource set and the second CMRs in the second resource set may be the same or different;
   in a case that the third CMRs in the first resource set and the first CMRs in the first resource set are the same, the first CMRs are received and measured according to an MTRP transmission assumption and an STRP transmission assumption, and the second CMRs in the second resource set are received and measured according to an NCJT transmission assumption; and in a case that the third CMRs in the first resource set and the first CMRs in the first resource set are different, the third CMRs in the first resource set are received and measured according to an STRP transmission assumption, and the first CMRs in the first resource set and the second CMRs in the second resource set are received and measured according to an MTRP transmission assumption; and in a case that the fourth CMRs in the second resource set and the second CMRs in the second resource set are the same, the CMRs are received and measured according to an MTRP transmission assumption and an STRP transmission assumption, and the first CMRs in the first resource set are received and measured according to an MTRP transmission assumption; and in a case that the fourth CMRs in the second resource set and the second CMRs in the second resource set are different, the fourth CMRs in the second resource set are received and measured according to an STRP transmission assumption, and the first CMRs in the first resource set and the second CMRs in the second resource set are received and measured according to an MTRP transmission assumption.

2. The method according to claim 1, wherein the indication information is further used for configuring or modifying at least one of the following:

the number of channel measurement resources CMR configured by the target CSI report configuration;

the number of joint measurement resource pairs configured by the target CSI report configuration;

a CMR state in the target CSI report configuration;

a CMR grouping mode configured by the target CSI report configuration;

a report quantity configured by the target CSI report configuration;

a QCL assumption corresponding to an RS configured by the target CSI report configuration;

or an association between the target CSI report configuration and a first CSI report configuration, wherein the terminal further comprises the first CSI report configuration, and the target CSI report configuration corresponds to a different TRP than the first CSI report configuration.

3. The method according to claim 2, wherein the measurement mapping mode is determined based on the number of valid resource sets in the at least two resource sets, the number of joint measurement resource pairs, and a report quantity configured by a CSI report configuration associated with the at least two resource sets;

or the measurement mapping mode is determined based on the number of valid resource sets in the at least two resource sets, the number of joint measurement resource pairs, a report quantity configured by a CSI report configuration associated with the at least two resource sets; and an association between associated CSI report configurations.

4. The method according to claim 2, wherein the number of joint measurement resource pairs is indicated by a field already present or newly added in the target CSI report configuration; or, wherein the CMR state is indicated by a field already present or newly added in the target CSI report configuration; or, wherein the measurement mapping mode is indicated by a field already present or newly added in the target CSI report configuration; or, wherein the association is indicated by a field defined or newly added in the target CSI report configuration.

5. The method according to claim 4, wherein in a case that the target CSI report configuration and the first CSI report configuration have an association, the target CSI report configuration and the first CSI report configuration satisfy the following condition:

fields defined or newly added in the target CSI report configuration and the first CSI report configuration have the same indications;

or the field defined or newly added in the target CSI report configuration indicates the first CSI report configuration and the field defined or newly added in the first CSI report configuration indicates the target CSI report configuration;

or

CMRs in the target CSI report configuration are indicated as IMRs in the first CSI report configuration by a field defined or newly added in the target CSI report configuration, and CMRs in the first CSI report configuration is indicated as IMRs in the target CSI report configuration by a field defined or newly added in the first CSI report configuration;

or a media access control MAC control element CE indication field for indicating the association indicates the target CSI report configuration and the first CSI report configuration.

6. The method according to claim 1, wherein in a case of performing reception and measurement according to the MTRP transmission assumption, a non-coherent joint transmission NCJT CSI measurement or MTRP beam pair measurement is comprised; and in a case of performing reception and measurement according to the STRP transmission assumption, an STRP CSI measurement or STRP beam measurement is comprised.

7. The method according to claim 1, wherein the indication information is carried in RRC signaling and MAC CE signaling, the RRC signaling being used for configuring multiple measurement configurations in the target CSI report configuration, and the MAC CE signaling being used for indicating one or at least two of the multiple measurement configurations; and reception, measurement, and reporting are performed according to the one or at least two measurement configurations indicated by the MAC CE signaling.

8. The method according to claim 7, wherein the measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

9. The method according to claim 1, wherein after the receiving indication information sent by a network-side device, the method further comprises:

in a case that the indication information is used to indicate configuration information of a target CSI report configuration of the terminal, performing reception, measurement, and reporting according to the target CSI report configuration configured by the indication information;

in a case that the indication information is used to indicate modification information of a target CSI report configuration of the terminal, modifying the target CSI report configuration according to the indication information, and performing reception, measurement, and reporting according to the modified target CSI report configuration;

or in a case that the indication information is used to indicate modification information of a target CSI report configuration of the terminal, performing reception, measurement, and reporting based on the target CSI report configuration and the modification information in the indication information.

10. The method according to claim 1, wherein the indication information is information for configuring, activating, deactivating, adding, deleting, or changing a measurement configuration in the target CSI report configuration.

11. A terminal, comprising a processor, a memory, and a program or instructions stored in the memory and capable of running on the processor, wherein when the program or instructions are executed by the processor, the following steps are implemented:

receiving indication information sent by a network-side device, wherein the indication information is used to indicate configuration or modification information of a target channel state information CSI report configuration of the terminal;

the indication information is used for configuring or modifying the following:

a measurement mapping mode between at least two resource sets, wherein all of the at least two resource sets are different resource sets configured by the target CSI report configuration;

the at least two resource sets comprise a first resource set and a second resource set, and the measurement mapping mode comprises:

a one-to-one mapping between CMRs in the first resource set and CMRs in the second resource set; or no mapping between CMRs in the first resource set and CMRs in the second resource set; or a one-to-one mapping between first CMRs in the first resource set and second CMRs in the second resource set, and no mapping between third CMRs in the first resource set and CMRs in another resource set of the at least two resource sets; or a one-to-one mapping between first CMRs in the first resource set and second CMRs in the second resource set, and no mapping between fourth CMRs in the second resource set and CMRs in another resource set of the at least two resource sets; or a one-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets;

in a case that the measurement mapping mode is a one-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different; and in a case that the measurement mapping mode is a one-to-one mapping between first CMRs in the first resource set and second CMRs in the second resource set, the fourth CMRs in the second resource set and the second CMRs in the second resource set may be the same or different;

in a case that the third CMRs in the first resource set and the first CMRs in the first resource set are the same, the first CMRs are received and measured according to an MTRP transmission assumption and an STRP transmission assumption, and the second CMRs in the second resource set are received and measured according to an NCJT transmission assumption; and in a case that the third CMRs in the first resource set and the first CMRs in the first resource set are different, the third CMRs in the first resource set are received and measured according to an STRP transmission assumption, and the first CMRs in the first resource set and the second CMRs in the second resource set are received and measured according to an MTRP transmission assumption; and in a case that the fourth CMRs in the second resource set and the second CMRs in the second resource set are the same, the CMRs are received and measured according to an MTRP transmission assumption and an STRP transmission assumption, and the first CMRs in the first resource set are received and measured according to an MTRP transmission assumption; and in a case that the fourth CMRs in the second resource set and the second CMRs in the second resource set are different, the fourth CMRs in the second resource set are received and measured according to an STRP transmission assumption, and the first CMRs in the first resource set and the second CMRs in the second resource set are received and measured according to an MTRP transmission assumption.

12. The terminal according to claim 11, wherein the indication information is further used for configuring or modifying at least one of the following:

the number of channel measurement resources CMR configured by the target CSI report configuration;

the number of joint measurement resource pairs configured by the target CSI report configuration;

a CMR state in the target CSI report configuration;

a CMR grouping mode configured by the target CSI report configuration;

a report quantity configured by the target CSI report configuration;

a QCL assumption corresponding to an RS configured by the target CSI report configuration;

or an association between the target CSI report configuration and a first CSI report configuration, wherein the terminal further comprises the first CSI report configuration, and the target CSI report configuration corresponds to a different TRP than the first CSI report configuration.

13. A non-transitory readable storage medium, wherein the non-transitory readable storage medium stores a program or instructions, and the program or instructions, when executed by a processor of a terminal, cause the processor to implement:

receiving indication information sent by a network-side device, wherein the indication information is used to indicate configuration or modification information of a target channel state information CSI report configuration of the terminal;

the indication information is used for configuring or modifying the following:

a measurement mapping mode between at least two resource sets, wherein all of the at least two resource sets are different resource sets configured by the target CSI report configuration;

the at least two resource sets comprise a first resource set and a second resource set, and the measurement mapping mode comprises:

a one-to-one mapping between CMRs in the first resource set and CMRs in the second resource set; or no mapping between CMRs in the first resource set and CMRs in the second resource set; or a one-to-one mapping between first CMRs in the first resource set and second CMRs in the second resource set, and no mapping between third CMRs in the first resource set and CMRs in another resource set of the at least two resource sets; or a one-to-one mapping between first CMRs in the first resource set and second CMRs in the second resource set, and no mapping between fourth CMRs in the second resource set and CMRs in another resource set of the at least two resource sets; or a one-to-one mapping between first CMRs in the first resource set and second CMRs in the second resource set, no mapping between third CMRs in the first resource set and CMRs in another resource set of the at least two resource sets, and no mapping between fourth CMRs in the second resource set and CMRs in another resource set of the at least two resource sets;

in a case that the measurement mapping mode is a one-to-one mapping between first CMRs in the first resource set and second CMRs in the second resource set, and that there is no mapping between third CMRs in the first resource set and CMRs in another resource set of the at least two resource sets, the third CMRs in the first resource set and the first CMRs in the first resource set may be the same or different; and in a case that the measurement mapping mode is a one-to-one mapping between first CMRs in the first resource set and second CMRs in the second resource set, the fourth CMRs in the second resource set and the second CMRs in the second resource set may be the same or different;

in a case that the third CMRs in the first resource set and the first CMRs in the first resource set are the same, the first CMRs are received and measured according to an MTRP transmission assumption and an STRP transmission assumption, and the second CMRs in the second resource set are received and measured according to an NCJT transmission assumption; and in a case that the third CMRs in the first resource set and the first CMRs in the first resource set are different, the third CMRs in the first resource set are received and measured according to an STRP transmission assumption, and the first CMRs in the first resource set and the second CMRs in the second resource set are received and measured according to an MTRP transmission assumption; and in a case that the fourth CMRs in the second resource set and the second CMRs in the second resource set are the same, the CMRs are received and measured according to an MTRP transmission assumption and an STRP transmission assumption, and the first CMRs in the first resource set are received and measured according to an MTRP transmission assumption; and in a case that the fourth CMRs in the second resource set and the second CMRs in the second resource set are different, the fourth CMRs in the second resource set are received and measured according to an STRP transmission assumption, and the first CMRs in the first resource set and the second CMRs in the second resource set are received and measured according to an MTRP transmission assumption.

14. The non-transitory readable storage medium according to claim 13, wherein the indication information is further used for configuring or modifying at least one of the following:

the number of channel measurement resources CMR configured by the target CSI report configuration;

the number of joint measurement resource pairs configured by the target CSI report configuration;

a CMR state in the target CSI report configuration;

a CMR grouping mode configured by the target CSI report configuration;

a report quantity configured by the target CSI report configuration;

a QCL assumption corresponding to an RS configured by the target CSI report configuration; or an association between the target CSI report configuration and a first CSI report configuration, wherein the terminal further comprises the first CSI report configuration, and the target CSI report configuration corresponds to a different TRP than the first CSI report configuration.

15. The non-transitory readable storage medium according to claim 14, wherein the measurement mapping mode is determined based on the number of valid resource sets in the at least two resource sets, the number of joint measurement resource pairs, and a report quantity configured by a CSI report configuration associated with the at least two resource sets;

or the measurement mapping mode is determined based on the number of valid resource sets in the at least two resource sets, the number of joint measurement resource pairs, a report quantity configured by a CSI report configuration associated with the at least two resource sets; and an association between associated CSI report configurations.

16. The non-transitory readable storage medium according to claim 14, wherein the number of joint measurement resource pairs is indicated by a field already present or newly added in the target CSI report configuration; or, wherein the CMR state is indicated by a field already present or newly added in the target CSI report configuration; or, wherein the measurement mapping mode is indicated by a field already present or newly added in the target CSI report configuration; or, wherein the association is indicated by a field defined or newly added in the target CSI report configuration.

17. The non-transitory readable storage medium according to claim 13, wherein in a case of performing reception and measurement according to the MTRP transmission assumption, a non-coherent joint transmission NCJT CSI measurement or MTRP beam pair measurement is comprised; and in a case of performing reception and measurement according to the STRP transmission assumption, an STRP CSI measurement or STRP beam measurement is comprised.

18. The non-transitory readable storage medium according to claim 13, wherein the indication information is carried in RRC signaling and MAC CE signaling, the RRC signaling being used for configuring multiple measurement configurations in the target CSI report configuration, and the MAC CE signaling being used for indicating one or at least two of the multiple measurement configurations; and reception, measurement, and reporting are performed according to the one or at least two measurement configurations indicated by the MAC CE signaling.

19. The non-transitory readable storage medium according to claim 18, wherein the measurement configuration is at least one of the number of measurement resources, a measurement resource state, the number of joint measurement resource pairs, a measurement resource grouping mode, a measurement mapping mode, a report quantity, an association, or a quasi-co-location QCL assumption.

20. The non-transitory readable storage medium according to claim 13, wherein after the receiving indication information sent by a network-side device, the method further comprises:

in a case that the indication information is used to indicate configuration information of a target CSI report configuration of the terminal, performing reception, measurement, and reporting according to the target CSI report configuration configured by the indication information;

in a case that the indication information is used to indicate modification information of a target CSI report configuration of the terminal, modifying the target CSI report configuration according to the indication information, and performing reception, measurement, and reporting according to the modified target CSI report configuration;

or in a case that the indication information is used to indicate modification information of a target CSI report configuration of the terminal, performing reception, measurement, and reporting based on the target CSI report configuration and the modification information in the indication information.

\* \* \* \* \*